US011474389B2

(12) United States Patent
Asamizu et al.

(10) Patent No.: US 11,474,389 B2
(45) Date of Patent: Oct. 18, 2022

(54) DISPLAY PANEL AND DISPLAY PANEL APPARATUS

(71) Applicant: SAKAI DISPLAY PRODUCTS CORPORATION, Sakai (JP)

(72) Inventors: Tomohiro Asamizu, Sakai (JP); Daisuke Teragawa, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 294 days.

(21) Appl. No.: 16/518,278

(22) Filed: Jul. 22, 2019

(65) Prior Publication Data
US 2020/0041835 A1    Feb. 6, 2020

(30) Foreign Application Priority Data
Aug. 3, 2018 (JP) .............................. JP2018-146955

(51) Int. Cl.
G02F 1/1335 (2006.01)
G09F 9/302 (2006.01)
G02F 1/13357 (2006.01)

(52) U.S. Cl.
CPC .. G02F 1/133514 (2013.01); G02F 1/133512 (2013.01); G02F 1/133602 (2013.01); G09F 9/302 (2013.01)

(58) Field of Classification Search
CPC ......... G02F 1/133305; G02F 1/133512; G02F 1/133514
See application file for complete search history.

(56) References Cited

U.S. PATENT DOCUMENTS

2014/0176856 A1*  6/2014  Lee .................... G02F 1/133305
                                                      349/61
2018/0157101 A1*  6/2018  Wu .................... G02F 1/133512

FOREIGN PATENT DOCUMENTS

JP          2007-333818 A      12/2007

* cited by examiner

Primary Examiner — Jessica M Merlin
(74) Attorney, Agent, or Firm — ScienBiziP, P.C.

(57) ABSTRACT

A display panel according to an embodiment of the present invention is a display panel having a display region including a plurality of pixels arrayed along a first direction and along a second direction which is different from the first direction, the display panel including a first substrate and a second substrate opposing each other, the first substrate and the second substrate being curved along the first direction. The first substrate has a color filter layer that includes: a plurality of color filters provided respectively corresponding to the plurality of pixels; and a black matrix having a plurality of light shielding portions disposed between adjacent color filters adjoining along the first direction. The second substrate includes a plurality of pixel electrodes respectively included in the plurality of pixels. The display region includes a central portion including a center of the display region along the first direction and, on both sides of the central portion along the first direction, a first end portion and a second end portion that are located adjacent to the central portion. The plurality of pixels include a plurality of central pixels contained in the central portion and a plurality of end pixels contained in the first end portion or the second end portion. The plurality of light shielding portions include a plurality of central light shielding portions contained in the central portion and a plurality of end light shielding portions contained in the first end portion or the second end portion. A width of the plurality of end light shielding portions along the first direction is greater than a width of the plurality of central light shielding portions along the first direction.

9 Claims, 19 Drawing Sheets

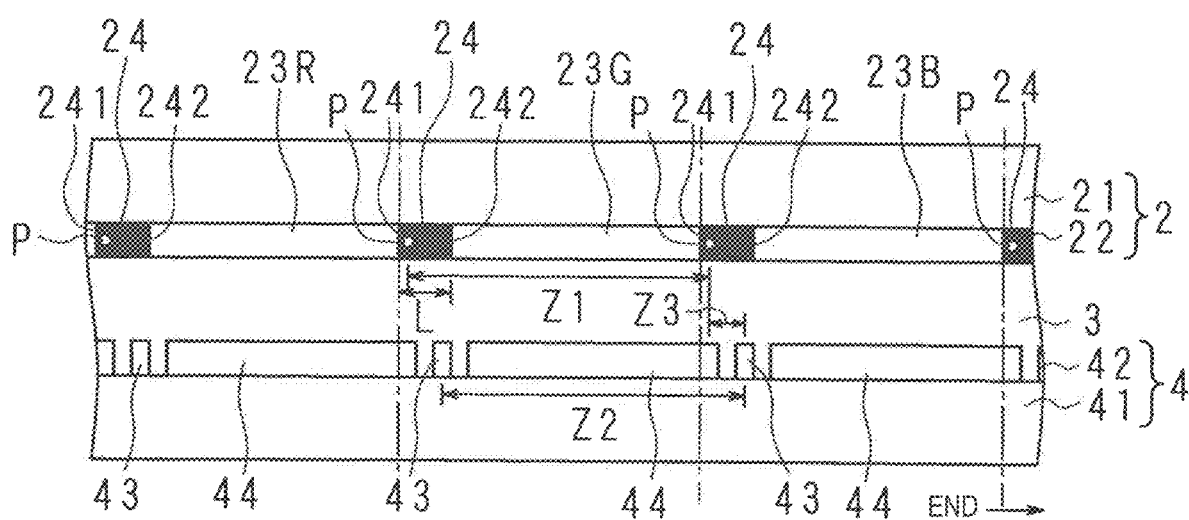

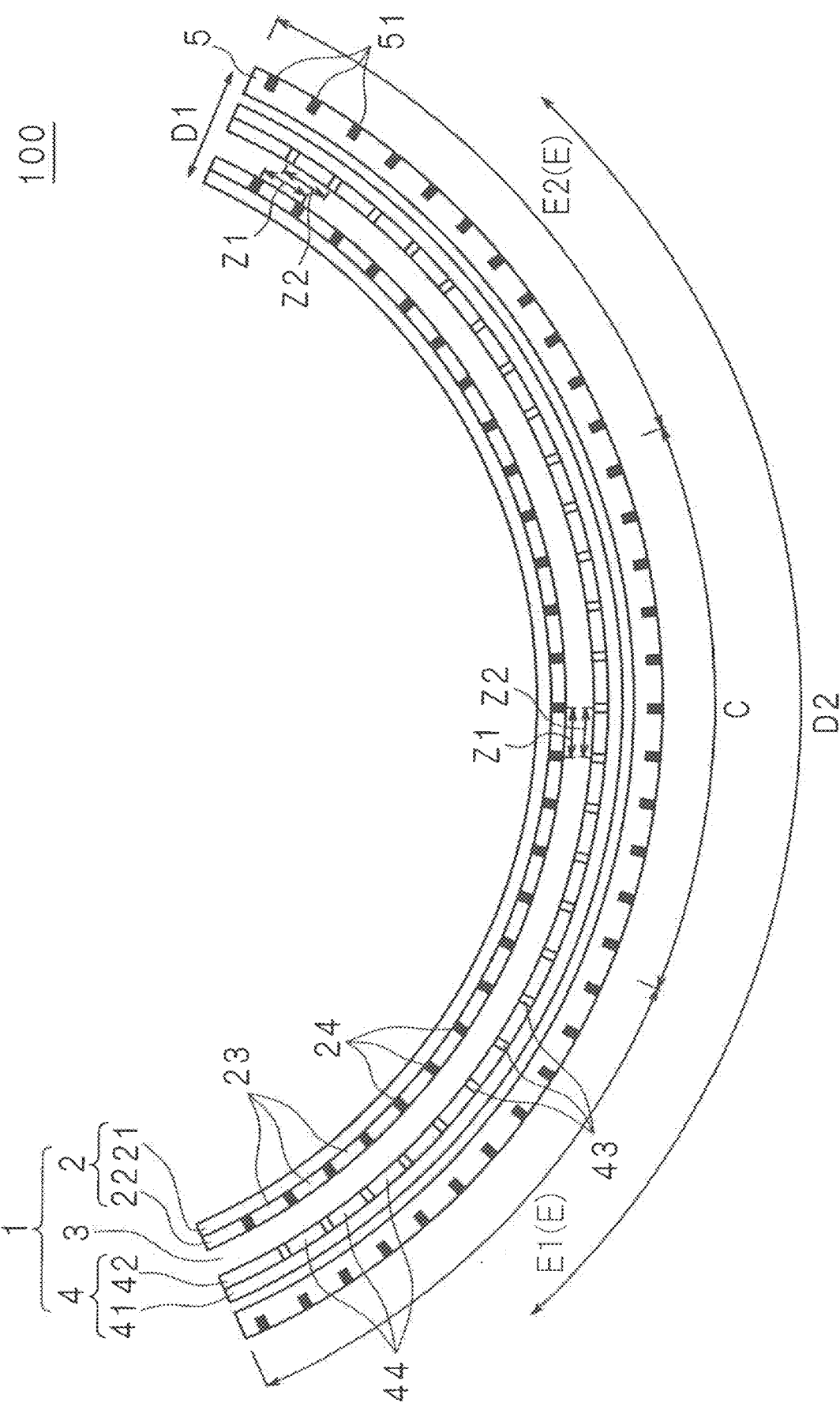

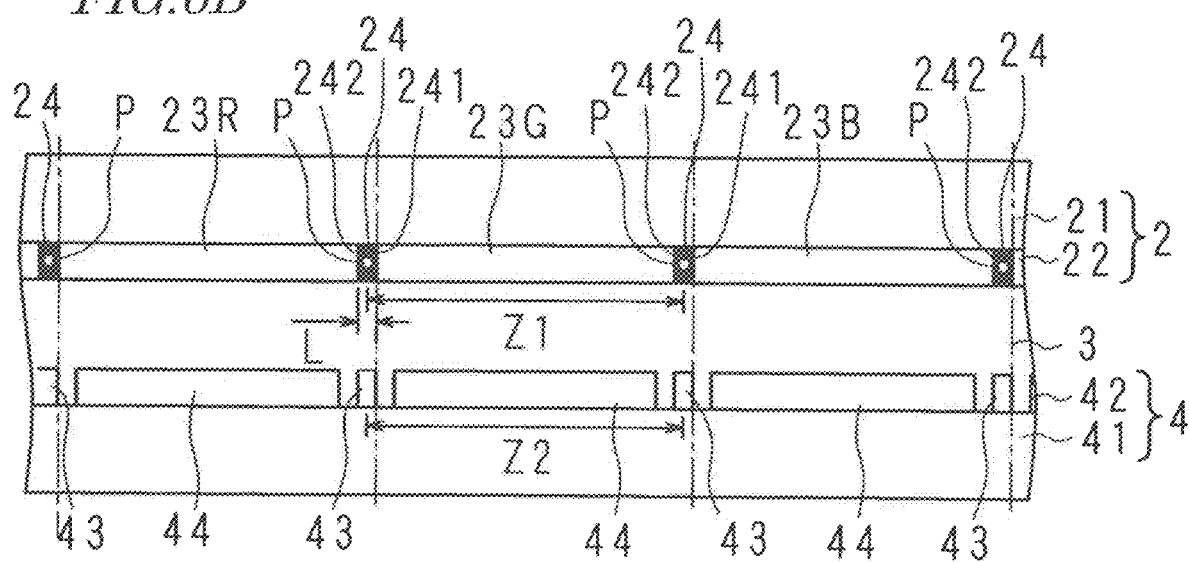

DISPLAY PANEL AND DISPLAY PANEL APPARATUS

BACKGROUND

1. Technical Field

The present invention relates to: a curved display panel having a substrate that includes color filters arranged in a matrix shape and light shielding portions interposed between the color filters; and a display panel apparatus that includes the display panel.

2. Description of the Related Art

In recent years, so-called curved displays have been gaining popularity, in which a pair of substrates opposing each other are curved so as to constitute a curved display surface.

However, since one substrate and the other substrate of such a curved display are opposed to each other while being curved, a varying radius of curvature exists because of the interspace into which liquid crystal is to be injected (i.e., thickness of the liquid crystal layer) and the thicknesses of the substrates. The varying radius of curvature induces a problem in that, as viewed from a radial direction, the positions of pixel electrodes in one substrate and the positions of color filters in the other substrate may not match but be misaligned near both ends along the circumferential direction, while they may match in a central portion along the peripheral direction (circumferential direction) of the curved surface, for example.

Against such a problem, for example, Patent Document 1 (Japanese Laid-Open Patent Publication No. 2007-333818) discloses a display panel in which a pitch along the curving direction of pixel regions of a substrate that is on the inner side of the curve is at least locally smaller than a pitch along the curving direction of pixel regions of a substrate that is on the outer side of the curve, thereby reducing misalignments in the pixel regions between the substrates as compared to the case where an identical pitch (along the curving direction) is adopted for the pixel regions of both substrates.

SUMMARY

On the other hand, if the aforementioned misalignments do occur, light which has passed through a pixel region that is associated with a pixel electrode may enter astride its two adjacent color filters. This leads to a problem in that, rather than a single color of R, G, B, etc., as desired, an intermixed color resulting from the colors of adjacent color filters may be displayed.

Against such a problem, the display panel of Patent Document 1 may be able to reduce misalignments in the pixel regions, but it cannot adequately prevent intermixing of colors associated with misalignments. Moreover, in the display panel of Patent Document 1, the amount of misalignments in the pixel regions needs to be anticipated in advance in order for the invention to be applied, and thus any misalignments beyond anticipation cannot be coped with.

The present invention has been made in view of the above circumstances, and an objective thereof is to provide a display panel having a curved substrate on which color filters arranged in a matrix shape and light shielding portions interposed between the color filters are disposed, and a display panel apparatus that includes the display panel, such that the aforementioned problem of intermixing of colors can be suppressed, this effect of suppressing the problematic intermixing of colors being stably obtained.

A display panel according to an embodiment of the present invention is a display panel having a display region including a plurality of pixels arrayed along a first direction and along a second direction which is different from the first direction, the display panel comprising a first substrate and a second substrate opposing each other, the first substrate and the second substrate being curved along the first direction, wherein, the first substrate has a color filter layer that includes: a plurality of color filters provided respectively corresponding to the plurality of pixels; and a black matrix having a plurality of light shielding portions disposed between adjacent color filters adjoining along the first direction; the second substrate includes a plurality of pixel electrodes respectively included in the plurality of pixels; the display region includes a central portion including a center of the display region along the first direction and, on both sides of the central portion along the first direction, a first end portion and a second end portion that are located adjacent to the central portion; the plurality of pixels include a plurality of central pixels contained in the central portion and a plurality of end pixels contained in the first end portion or the second end portion; the plurality of light shielding portions include a plurality of central light shielding portions contained in the central portion and a plurality of end light shielding portions contained in the first end portion or the second end portion; and a width of the plurality of end light shielding portions along the first direction is greater than a width of the plurality of central light shielding portions along the first direction.

According to an embodiment of the present invention, in a display panel having a curved substrate and a display panel apparatus that includes such a display panel, the aforementioned problem of intermixing of colors can be suppressed. Moreover, the effect of suppressing the problematic intermixing of colors can be stably obtained.

BRIEF DESCRIPTION OF THE DRAWINGS

FIG. 2C is an enlarged view of a portion of the liquid crystal panel in FIG. 1 corresponding to a broken-lined circle F on the right side of the figure.

FIG. 5 is a diagram schematically showing a main configuration of a liquid crystal panel of a panel module according to Embodiment 3.

FIG. 6B is an enlarged view in which a central portion along the circumferential direction in FIG. 5 is shown enlarged.

DETAILED DESCRIPTION

Hereinafter, on the basis of the drawings, display panel apparatuses according to embodiments of the present invention will be described in detail, with reference to panel modules that include a so-called liquid crystal panel and a light source.

Embodiment 1

Figure 1:
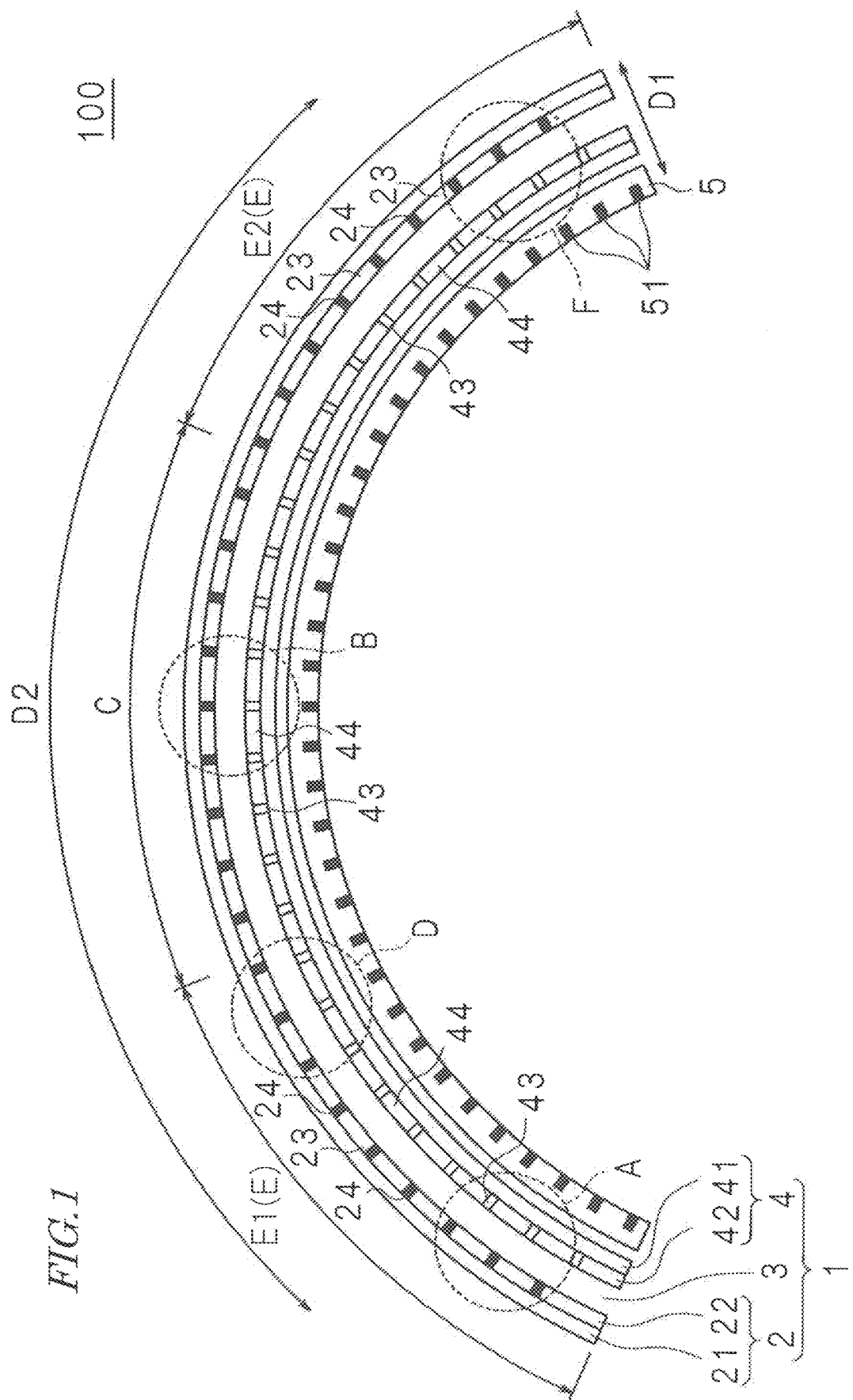
FIG. 1 is a diagram schematically showing a main configuration of a panel module according to Embodiment 1.

FIG. 1 is a diagram schematically showing a main configuration of a panel module 100 according to Embodiment 1. The panel module 100 includes a liquid crystal panel 1 and a light source 5 which emits light to the liquid crystal panel 1.

The liquid crystal panel 1 has a display region including a plurality of pixels arrayed along a first direction and along a second direction which is different from the first direction. The liquid crystal panel 1 includes a CF substrate (first substrate) 2 and an active matrix substrate (second substrate) 4 opposing each other. The CF substrate 2 and the active matrix substrate 4 are curved along the first direction. Herein, the CF substrate 2 and the active matrix substrate 4 are curved so as to be convex toward the CF substrate 2. The CF substrate 2 has a color filter layer 22 that includes: a plurality of color filters 23 provided respectively corresponding to the plurality of pixels; and a black matrix 24 having a plurality of light shielding portions disposed between adjacent color filters 23 adjoining along the first direction. The active matrix substrate 4 includes a plurality of pixel electrodes 44 respectively included in the plurality of pixels. The display region includes a central portion C including the center of the display region along the first direction and, on both sides of the central portion C along the first direction, a first end portion (excess portion) E1 and a second end portion (excess portion) E2 that are located adjacent to the central portion C. The plurality of pixels include a plurality of central pixels contained in the central portion C and a plurality of end pixels contained in the first end portion E1 or the second end portion E2. The plurality of light shielding portions include a plurality of central light shielding portions contained in the central portion C and a plurality of end light shielding portions contained in the first end portion E1 or the second end portion E2. The width of the plurality of end light shielding portions along the first direction is greater than the width of the plurality of central light shielding portions along the first direction.

Herein, regarding a certain end pixel among the plurality of end pixels, a center B1 along the first direction of a first light shielding portion disposed closer to the central portion, a center B2 along the first direction of a second light shielding portion disposed on an opposite side from the central portion, and a center O along the first direction of the certain end pixel are located so that a distance between the center O and the center B1 along the first direction is greater than a distance between the center O and the center B2 along the first direction.

The liquid crystal panel 1 includes the active matrix substrate 4 and the CF (color filter) substrate 2 which is opposed to the active matrix substrate 4. A liquid crystal layer 3 is interposed between the active matrix substrate 4 and the CF substrate 2.

The liquid crystal panel 1 is rectangular, and is curved with a predetermined curvature so as to be, for example, convex toward the CF substrate 2 (i.e., the CF substrate 2 is disposed on the outer side of the convex surface of the liquid crystal panel 1 and that the active matrix substrate 4 is disposed on the inner side of the convex surface). Specifically, the active matrix substrate 4 and the CF substrate 2 are curved with similar curvatures. Regarding the radial direction D1, the liquid crystal panel 1 has the active matrix substrate 4 disposed on the inner side and the CF substrate 2 disposed on the outer side.

The light source 5 is a so-called direct-lit type, defining a housing of a flattened rectangular solid with one open face. The light source 5 has a plurality of LEDs 51, 51, . . . 51 provided on its bottom surface, such that light from the LEDs 51, 51, . . . 51 is emitted to the liquid crystal panel 1 via the opening opposed to the bottom surface. Moreover, the light source 5 is curved so that the bottom surface is concaved, with a similar curvature to that of the liquid crystal panel 1. In other words, in the panel module 100, the light source 5 is located the innermost along the radial direction D1. Therefore, light from the light source 5 enters in a substantially perpendicular direction to the active matrix substrate 4. Note that, without being limited to a direct-lit type, the light source 5 may also be a so-called edge-lit type.

The CF substrate 2 includes a glass substrate 21 and the color filter layer 22 being provided on the inner surface of the glass substrate 21 that is closer to the active matrix substrate 4. Regarding the radial direction D1, the glass substrate 21 is disposed on the outer side, whereas the color filter layer 22 is disposed on the inner side. Stated otherwise, the CF substrate 2 is curved so as to be convex toward the glass substrate 21.

The glass substrate 21 is shaped as a transparent rectangular plate. On the inner surface of the glass substrate 21, color filters 23R for the R pixels, color filters 23G for the G pixels, and color filters 23B for the B pixels, as described below, are provided in a matrix shape. Hereinafter, for convenience of explanation, the color filters 23R, the color filters 23G, and the color filters 23B may also be referred to as the color filters 23.

Specifically, along the longitudinal direction (first direction) of the glass substrate 21, the color filters 23R, the color filters 23G, and the color filters 23B alternate in this order.

In other words, since the glass substrate 21 (liquid crystal panel 1) is curved along its longitudinal direction (first direction), the color filters 23R, the color filters 23G, and the color filters 23B alternate in this order along the peripheral direction (e.g., the circumferential direction) D2 of the curved surface of the liquid crystal panel 1. The color filters 23R, the color filters 23G, and the color filters 23B may present stripes extending along the second direction, for example.

On the inner surface of the glass substrate 21, the black matrix (hereinafter referred to as BM) 24 is provided in a lattice shape. In other words, on the inner surface of the glass substrate 21, along the longitudinal direction and the transverse direction of the glass substrate 21, the BM (light shielding portions) 24 is provided between the color filters 23R, the color filters 23G, and the color filters 23B. Between the color filters 23 and the liquid crystal layer 3, a transparent electrode (not shown) is provided. In other words, the CF substrate 2 has a counter electrode opposing the pixel electrodes. Since the counter electrode is provided in common for all of the pixels, it may also be referred to as a common electrode. Depending on the display mode, the common electrode may be provided in the active matrix substrate 4 rather than in the CF substrate 2.

The active matrix substrate 4 includes a glass substrate 41 and an electrode layer 42 that is provided on the inner surface of the glass substrate 41 that is closer to the CF substrate 2. Regarding the radial direction D1, the electrode layer 42 is disposed on the outer side, and the glass substrate 41 is disposed on the inner side. In other words, the active matrix substrate 4 is curved so as to be convex toward the electrode layer 42.

The glass substrate 41 is shaped as a transparent rectangular plate, with the electrode layer 42 being formed on the inner surface of the glass substrate 41. In the electrode layer 42, wiring lines 43 (signal lines and scanning lines) are formed in a lattice shape. Specifically, in the electrode layer 42, a plurality of signal lines (not shown) and scanning lines (not shown) are disposed so as to intersect one another, with the pixel electrodes 44 being provided so as to overlap a region that is surrounded by the signal lines and the scanning lines. In other words, the wiring lines 43 are formed in a lattice shape, and the pixel electrodes 44 are arranged in a matrix shape.

To the scanning lines, scanning signals are supplied from a scanning driving circuit by a line sequential method. To the signal lines, a display signal to be supplied to each pixel electrode 44 is supplied from a signal driving circuit. Based on the signal that is supplied to the pixel electrode 44 from the signal line, as a voltage is applied across the liquid crystal layer 3 between a pixel electrode 44 and the transparent electrode (common electrode) on the CF substrate 2, the luminance (grayscale level) to be presented by that pixel is attained.

For example, in the normally black mode, when no voltage is applied between a pixel electrode 44 and the transparent electrode (common electrode) of the CF substrate 2, the lowest grayscale level (black displaying state) is presented. When a maximum voltage is applied between a pixel electrode 44 and the transparent electrode of the CF substrate 2, the highest grayscale level (white displaying state) is presented. It will be appreciated that the liquid crystal panel according to the present embodiment may also adopt a normally white mode.

When the CF substrate 2 and the active matrix substrate 4 as such are opposed to each other in a planar form, i.e., without being curved, the positions of the color filters 23 of the CF substrate 2 and the positions of the pixel electrodes 44 of the active matrix substrate 4 will substantially match as viewed along the opposing direction. Such a state will uniformly exist across the entire liquid crystal panel.

However, when the CF substrate 2 and the active matrix substrate 4 are opposed to each other while being curved, a varying radius of curvature will exist because of the thicknesses of the substrates and the thickness of the liquid crystal layer 3 (i.e., the interspace into which liquid crystal is to be injected). The varying radius of curvature induces a problem in that the positions of the pixel electrodes 44 and the color filters 23 as viewed along the opposing direction may not match but be misaligned near both ends of the liquid crystal panel 1, while they may match in a central portion of the liquid crystal panel 1 along the circumferential direction D2, for example.

Figure 2A:
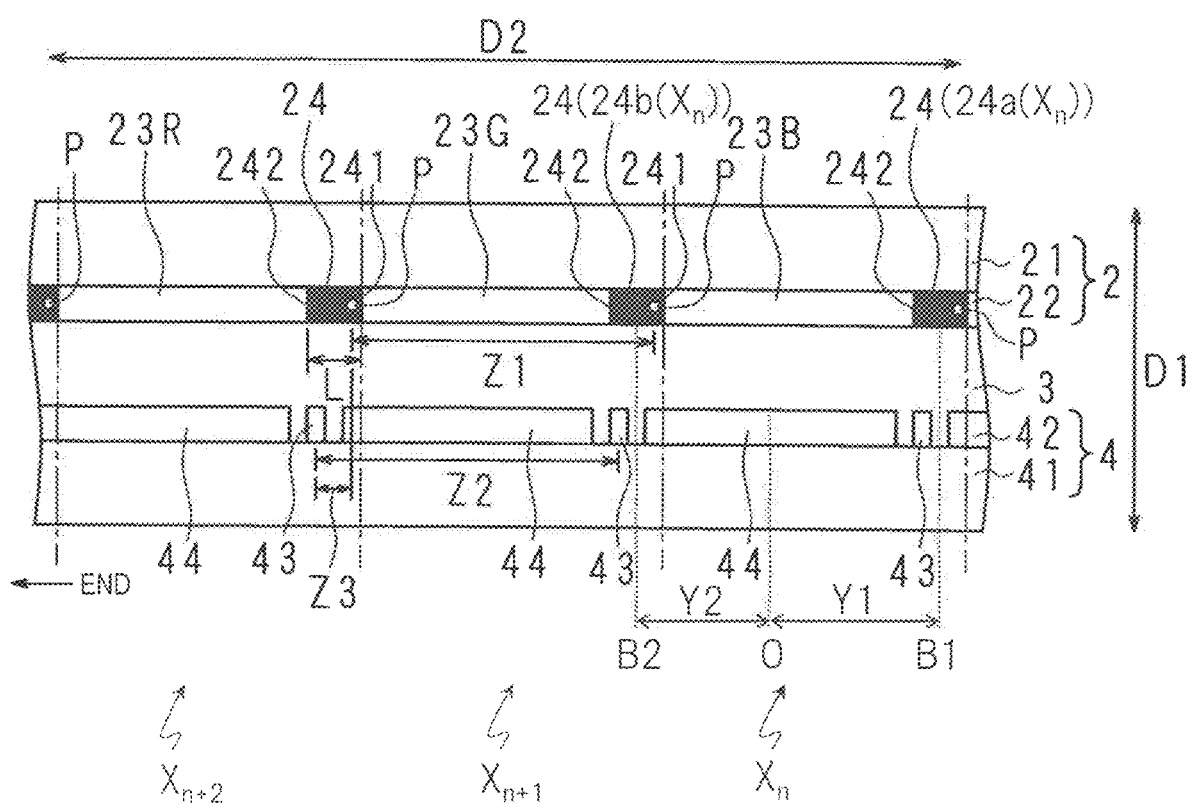
FIG. 2A is an enlarged view of a portion of the liquid crystal panel in FIG. 1 corresponding to a broken-lined circle A on the left side of the figure.
Figure 2B:
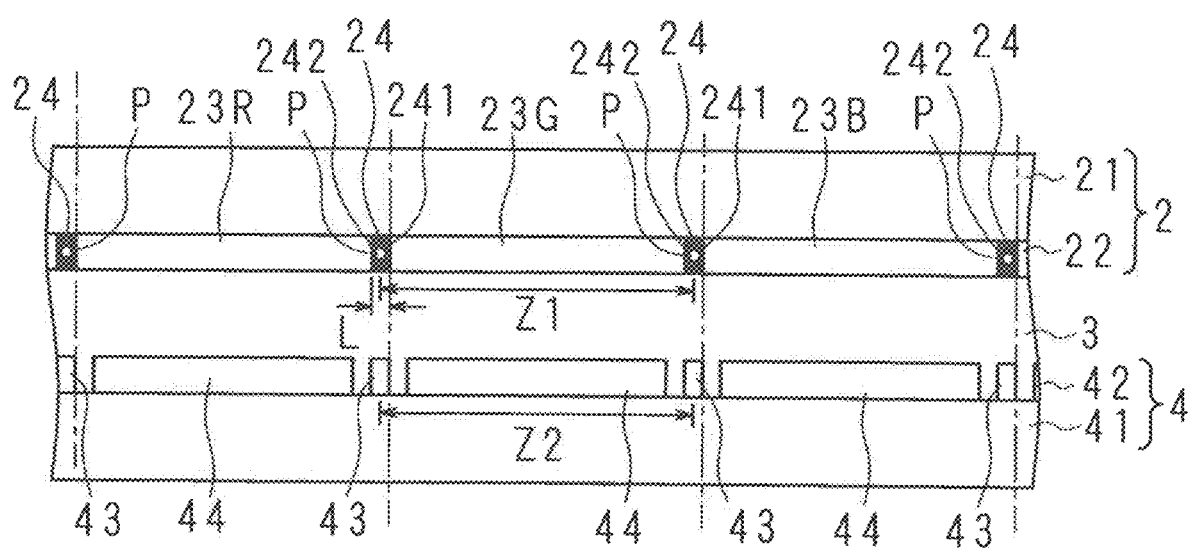
FIG. 2B is an enlarged view of a portion of the liquid crystal panel in FIG. 1 corresponding to a broken-lined circle B at the central portion of the figure.

FIG. 2A, FIG. 2B, and FIG. 2C are enlarged views in which portions corresponding to three broken-lined circles in FIG. 1 are shown enlarged. FIG. 2A is an enlarged view of a portion of the liquid crystal panel 1 in FIG. 1 corresponding to a broken-lined circle A on the left side of the figure; FIG. 2B is an enlarged view of a portion of the liquid crystal panel 1 in FIG. 1 corresponding to a broken-lined circle B at the central portion of the figure; and FIG. 2C is an enlarged view of a portion of the liquid crystal panel 1 in FIG. 1 corresponding to a broken-lined circle F on the right side of the figure.

Hereinafter, in the liquid crystal panel 1 (the CF substrate 2, the active matrix substrate 4), any portion excluding the central portion along the circumferential direction D2 may also be referred to as an excess portion. Herein, the central portion of the liquid crystal panel 1 (the CF substrate 2, the active matrix substrate 4) along the circumferential direction D2 may be, for example, when the liquid crystal panel 1 is equally divided into three portions along the circumferential direction D2, the portion in the middle along the circumferential direction D2. That is, in FIG. 1, the central portion of the liquid crystal panel 1 (the CF substrate 2, the active matrix substrate 4) corresponds to C (hereinafter referred to as the central portion C), whereas a portion that combines a portion E1 (first end portion E1) on the left side of the figure and a portion E2 (second end portion E2) on the right side of the figure with respect to the central portion C is the excess portion (hereinafter referred to as the excess portion E). FIG. 2A and FIG. 2C show end pixels, whereas FIG. 2B shows central pixels. Although the example shown illustrates the central portion C to be an approximately ⅓ region of the liquid crystal panel 1, the present embodiment is not limited thereto. The central portion of the display region may span any range, so long as the center of the display region along the first direction (circumferential direction D2) is included.

In the following, in the color filter layer 22 of the CF substrate 2, the regions that are surrounded by the BM 24, including regions occupied by the respective color filters 23, are referred to as color filter regions Z1. For example, along the circumferential direction D2, the color filter regions Z1 correspond to the interspaces between points P, which will be described later. In the electrode layer 42, the regions containing the pixel electrodes 44, as defined by the wiring lines 43 (signal lines and scanning lines), are referred to as pixel electrode regions Z2. For example, along the circumferential direction D2, the pixel electrode regions Z2 correspond to the interspaces between the centers of the wiring lines 43. With reference to FIG. 2A, FIG. 2B, and FIG. 2C, the aforementioned problem will be described in detail.

As shown in FIG. 2B, in the central portion C, color filter regions Z1 and pixel electrode regions Z2 are orthogonally opposed, such that, as viewed from the radial direction D1, the BM 24 and the wiring lines 43 match in position. In FIG. 2B, the color filter regions Z1 and the pixel electrode regions Z2 match.

However, as shown in FIG. 2A and FIG. 2C, in the excess portion E, color filter regions Z1 and pixel electrode regions Z2 are not orthogonally opposed. In the liquid crystal panel 1, at the portion E1 which is on the left side of the figure with respect to the central portion C, the pixel electrode region Z2 is misaligned toward the left end along the circumferential direction D2 (see FIG. 2A). Moreover, in the liquid crystal panel 1, at the portion E2 which is on the right side of the figure with respect to the central portion C, the pixel electrode region Z2 is misaligned toward the right end along the circumferential direction D2 (see FIG. 2C).

In other words, the pixel electrode region Z2 that needs to be opposed to one color filter region Z1 is suffering a misalignment, such that a portion of the pixel electrode region Z2 is opposed to another color filter region Z1 that is adjacent to the one color filter region Z1, along the radial direction D1. In the following, such a portion of the pixel electrode region Z2 will be referred to as a deviation.

As a result, an intermixing of colors may occur in the excess portion E because of the misalignment of the pixel electrode region Z2. That is, in the excess portion E, if a misalignment of the pixel electrode region Z2 occurs, light from the light source 5 may pass through one pixel electrode region Z2 and enter astride two adjacent color filter regions Z1. As a result, rather than a single color of R, G, and B as desired, an intermixed color resulting from the colors of adjacent color filters 23 will be displayed.

However, the panel module 100 according to the present embodiment is constructed so that such a problem of intermixing of colors can be suppressed. Hereinafter, this will be described in detail.

The panel module 100 according to the present embodiment is constructed so that the width of the BM 24 along the circumferential direction D2 differs between the central portion C and the excess portion E of the CF substrate 2. Specifically, the width (width along the first direction) of the BM 24 (end light shielding portions 24) in the excess portion E of the CF substrate 2 is broader than the width (width along the first direction) of the BM 24 (central light shielding portions 24) in the central portion C.

The BM 24 is provided so as to have predetermined interspaces along the circumferential direction D2. The BM 24 is such that the interspace between a given end 241 that is closer to the central portion to another opposite end 242 (i.e., the width of each light shielding portion along the first direction) is not constant along the circumferential direction D2.

Moreover, the BM 24 is constructed so that the dimension L from each given end 241 to the other end 242 along the circumferential direction D2 is greater in the excess portion E of the CF substrate 2 than at the central portion C of the CF substrate 2.

In the following, for convenience of explanation, the interspaces in the BM 24 (see FIG. 2B) at the central portion C of the liquid crystal panel 1, where misalignments in the pixel electrode regions Z2 do not occur, are used as reference interspaces; and, per reference interspace, points P are registered at both ends of the center along the circumferential direction D2.

In FIG. 2A, FIG. 2B, and FIG. 2C, dot-dash lines pass at given ends 241 of the BM 24 along the radial direction D1.

For example, in the excess portion E (the portion E1 in FIG. 1) shown in FIG. 2A, the closer end of the CF substrate 2 along the circumferential direction D2 is on the left side of the figure, whereas the central portion side is on the right side of the figure. Therefore, each given end 241 of the BM 24 is on the right side of the figure, whereas the other end 242 is on the left side of the figure. On the other hand, in the excess portion E shown in FIG. 2C (the portion E2 in FIG. 1), the closer end of the CF substrate 2 along the circumferential direction D2 is on the right side of the figure, whereas the central portion side is on the left side of the figure. Therefore, each given end 241 of the BM 24 is on the left side of the figure, whereas the other end 242 is on the right side of the figure. Furthermore, the BM 24 is such that the dimension L from each given end 241 to the other end 242 along the circumferential direction D2 is greater in the excess portion E (FIG. 2A and FIG. 2C) of the CF substrate 2 than at the central portion C of the CF substrate 2 (FIG. 2B).

With such construction, in the panel module 100 according to the present embodiment, intermixing of colors is suppressed in the excess portion E even if misalignments in the pixel electrode regions Z2 occur in the aforementioned manner. Hereinafter, this will be described in detail with reference to FIG. 2A (the portion E1 in the excess portion E).

A pixel electrode region Z2 that needs to be orthogonally opposed to the color filter region Z1 of a color filter 23G may suffer a misalignment toward the left side of the figure regarding the radial direction D1, whereby a portion of the pixel electrode region Z2 may become opposed also to a portion of the color filter region Z1 of a color filter 23R. In this state, light that substantially perpendicularly enters the active matrix substrate 4 will pass through the pixel electrode region Z2 and the liquid crystal layer 3, and enter the CF substrate 2. However, since the pixel electrode region Z2 is misaligned, such light will enter astride the color filter regions Z1 of the color filter 23G and the color filter 23R.

However, in the panel module 100 according to the present embodiment, the dimension L of the BM 24 along the circumferential direction D2 is greater in the excess portion E than at the central portion C of the CF substrate 2. Therefore, a deviation Z3 of the pixel electrode region Z2 on the left side of the figure will substantially match the position of a portion including the other end 242 (the portion beginning from a given end 241 of the BM 24 that is closer to the central portion and extending to the other opposite end 242, i.e., a light shielding portion) regarding the circumferential direction D2, and become opposed to the portion including the other end 242 regarding the radial direction D1. As a result, even if light enters astride the color filter regions Z1 of the color filter 23G and the color filter 23R, the light that has entered the color filter region Z1 of the color filter 23R will be blocked by the portion of the BM 24 including the other end 242. That is, light which has been transmitted through the color filter 23R will not be included in the displaying by a G pixel having the color filter 23G, and thus intermixing of colors will not occur.

The portion E2 in the excess portion E will be described in detail with reference to FIG. 2C.

A pixel electrode region Z2 that needs to be orthogonally opposed to the color filter region Z1 of a color filter 23G may suffer a misalignment toward the right side of the figure regarding the radial direction D1, whereby a portion of the pixel electrode region Z2 may become opposed also to a portion of the color filter region Z1 of a color filter 23B. In this state, light will enter astride the color filter regions Z1 of the color filter 23G and the color filter 23B.

However, in the panel module 100 according to the present embodiment, the dimension L of the BM 24 along the circumferential direction D2 is greater in the excess portion E than at the central portion C of the CF substrate 2. Therefore, a deviation Z3 of the pixel electrode region Z2 on the right side of the figure will substantially match the position of a portion including the other end 242 (the portion beginning from a given end 241 of the BM 24 that is closer to the central portion and extending to the other opposite end 242, i.e., a light shielding portion) regarding the circumferential direction D2, and become opposed to the portion including the other end 242 regarding the radial direction D1. As a result, even if light enters astride the color filter regions Z1 of the color filter 23G and the color filter 23B, the light that has entered the color filter region Z1 of the color filter 23B will be blocked by the portion of the BM 24 including the other end 242. That is, light which has been transmitted through the color filter 23B will not be included in the displaying by a G pixel having the color filter 23G, and thus intermixing of colors will not occur.

On the other hand, as shown in FIG. 2B, the aforementioned misalignments in the pixel electrode regions Z2 do not occur at the central portion C, and thus no deviation exists; although the dimension L of the BM 24 along the circumferential direction D2 is smaller than in the excess portion E of the CF substrate 2, no problem of intermixing of colors will occur.

Moreover, in this manner, the panel module 100 according to the present embodiment is constructed so that, the dimension L along the circumferential direction D2 is greater than in the central portion C only in the BM 24 in the excess portion E where misalignments in the pixel electrode regions Z2 could occur, i.e., except in the central portion C where misalignments in the pixel electrode regions Z2 will not occur. As a result, the problem of intermixing of colors can be addressed more efficiently.

As shown in FIG. 2A, the first end portion E1 includes a plurality of end pixels. The end pixels shown in FIG. 2A will be denoted as end pixels $X_n$, $X_{n+1}$ and $X_{n+2}$, these being closer to the central portion C in this order. Regarding the end pixel $X_n$, the center B1 of a first light shielding portion 24a ($X_n$) that is disposed closer to the central portion C along the first direction, the center B2 of a second light shielding portions 24b ($X_n$) that is disposed opposite from the central portion C along the first direction, and the center O of the end pixel $X_n$ along the first direction are located so that the distance Y1 between the center O and the center B1 along the first direction is greater than the distance Y2 between the center O and the center B2 along the first direction (Y1>Y2). The center O of the end pixel $X_n$ along the first direction may be, for example, the center of the pixel electrode 44 that is included in the end pixel $X_n$, as taken along the first direction. The center O of the end pixel $X_n$ along the first direction may be the center of the pixel electrode region Z2 including the pixel electrode 44 that is included in the end pixel $X_n$, as taken along the first direction. The center B1 of the first light shielding portion 24a along the first direction is the center between a given end 241 of the first light shielding portion 24a that is closer to the central portion C and the other opposite end 242. The center B2 of the second light shielding portion 24b along the first direction is the center between a given end 241 of the second light shielding portion 24b that is closer to the central portion C and the other opposite end 242. Note that, the second light shielding portion 24b ($X_n$) for the end pixel $X_n$ is the first light shielding portion 24a ($X_{n+1}$) for the end pixel $X_{n+1}$ that is adjacent to the end pixel $X_n$ on the opposite side from the central portion C.

Note that, although illustration and description thereof will be omitted, the aforementioned relationship (Y1≥Y2) holds true also in the second end portion E2 shown in FIG. 2C.

Embodiment 2

A liquid crystal panel 1 of a panel module 100 according to Embodiment 2 is constructed so that the dimension L of a BM 24 along the circumferential direction D2 differs depending on the position on the liquid crystal panel 1 (CF substrate 2) along the circumferential direction D2. Hereinafter, this will be described in detail.

That is, the liquid crystal panel 1 in the present embodiment has the following construction. A first end portion includes a first region disposed closer to the central portion and a second region disposed on an opposite side from the central portion. A second end portion includes a third region disposed closer to the central portion and a fourth region disposed on an opposite side from the central portion. The plurality of end light shielding portions include a plurality of first end light shielding portions contained in the first region, a plurality of second end light shielding portions contained in the second region, a plurality of third end light shielding portions contained in the third region, and a plurality of fourth end light shielding portions contained in the fourth region. The width of the plurality of second end light shielding portions along the first direction is greater than the width of the plurality of first end light shielding portions along the first direction. The width of the plurality of fourth end light shielding portions along the first direction is greater than the width of the plurality of third end light shielding portions along the first direction.

Figure 3A:
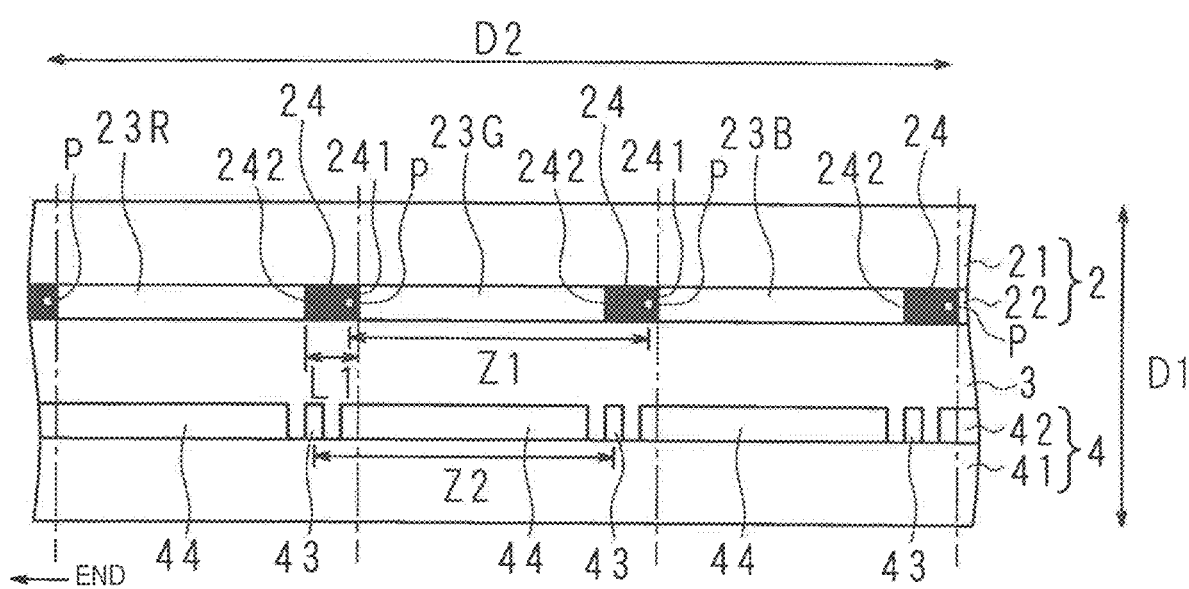
FIG. 3A is an enlarged view of a portion of the liquid crystal panel in FIG. 1 corresponding to a broken-lined circle A on the left side of the figure.
Figure 3B:
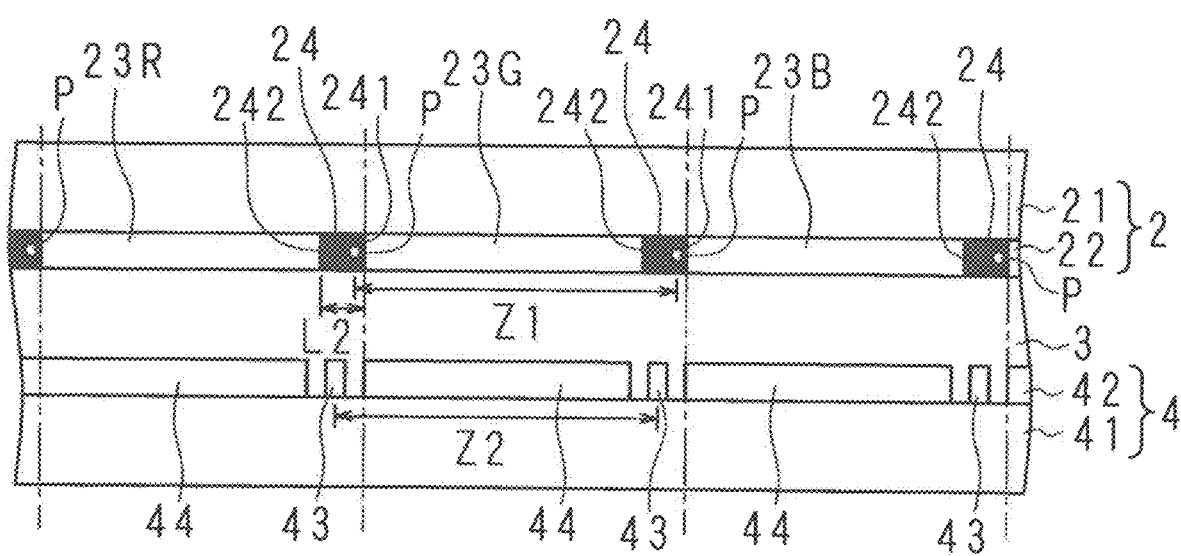
FIG. 3B is an enlarged view of a portion of the liquid crystal panel in FIG. 1 corresponding to a broken-lined circle D on the left side of the figure.
Figure 3C:
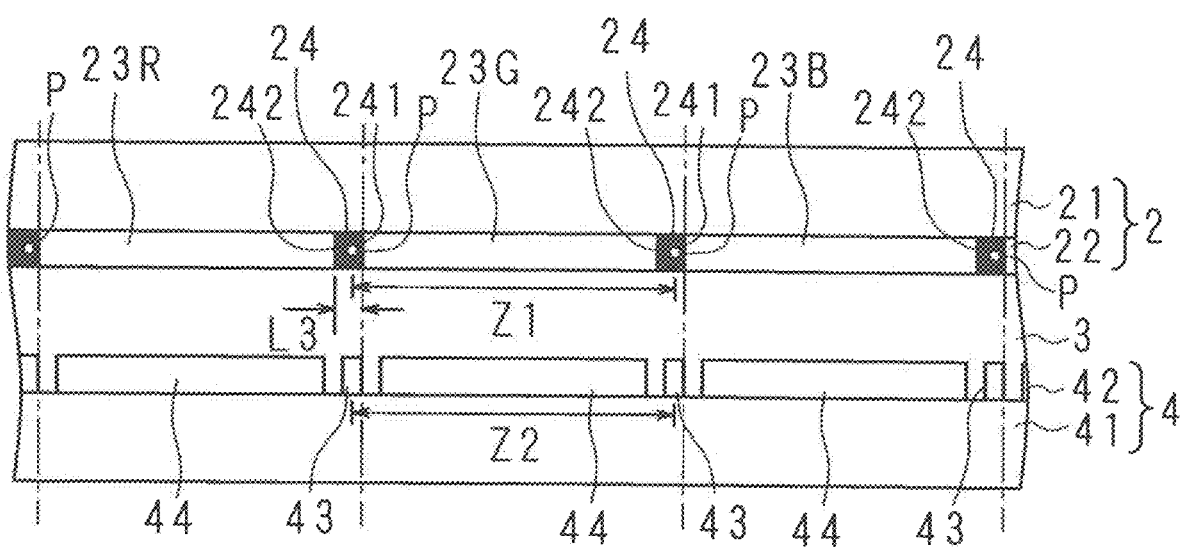
FIG. 3C is an enlarged view of a portion of the liquid crystal panel in FIG. 1 corresponding to a broken-lined circle B at the central portion of the figure.

FIG. 3A, FIG. 3B, and FIG. 3C are enlarged views, regarding the liquid crystal panel 1 of the panel module 100 according to Embodiment 2, in which portions corresponding to three broken-lined circles in FIG. 1 are shown enlarged. FIG. 3A is an enlarged view of a portion of the liquid crystal panel 1 in FIG. 1 corresponding to a broken-lined circle A on the left side of the figure; FIG. 3B is an enlarged view of a portion of the liquid crystal panel 1 in FIG. 1 corresponding to a broken-lined circle D on the left side of the figure; and FIG. 3C is an enlarged view of a portion of the liquid crystal panel 1 in FIG. 1 corresponding to a broken-lined circle B at the central portion of the figure.

That is, FIG. 3A, FIG. 3B, and FIG. 3C show, along the circumferential direction D2, portions from the center to the left in the figure of the liquid crystal panel 1. FIG. 3C shows a central portion of the liquid crystal panel 1 along the circumferential direction D2; FIG. 3A shows a left end portion in the figure of the liquid crystal panel 1 along the circumferential direction D2; and FIG. 3B shows a portion which is on the left side of the central portion in the figure of the liquid crystal panel 1 along the circumferential direction D2, but which is closer to the central portion than is the left end in the figure. Note that FIG. 3C shows, within the central portion of the liquid crystal panel 1, what lies slightly towards the left of the center along the circumferential direction D2.

In FIG. 3A and FIG. 3B, the pixel electrode region Z2 is misaligned toward the left end in the figure of the liquid crystal panel 1 along the circumferential direction D2. Also, it can be seen that, along the circumferential direction D2, the pixel electrode region Z2 is misaligned to a greater extent as getting closer to the left end in the figure of the liquid crystal panel 1, that is, away from the center.

Accordingly, the liquid crystal panel 1 of the panel module 100 according to the present embodiment is constructed so that, in the central portion C and the excess portion E of the CF substrate 2, the dimension from a given end 241 to the other end 242 of the BM 24 along the circumferential direction D2 increases away from the center of the liquid crystal panel 1 (CF substrate 2) along the circumferential direction D2.

As shown in FIG. 1, in the liquid crystal panel 1 of the panel module 100 according to the present embodiment, the portion indicated in the broken-lined circle A corresponds to an end on the left side of the figure along the circumferential direction D2 relative to the portions indicated in the broken-lined circles D and B. In the portion indicated in the broken-lined circle A as such, along the circumferential direction D2, it is ensured that the dimension L1 (FIG. 3A) from a given end 241 to the other end 242 of the BM 24 is greater than the respective dimensions L2 (FIG. 3B) and L3 (FIG. 3C) of the BM 24 within the broken-lined circles D and B.

Moreover, in the liquid crystal panel 1 of the panel module 100 according to the present embodiment, the portion indicated in the broken-lined circle D of FIG. 1 corresponds to a portion which is closer to the central portion than is the portion indicated in the broken-lined circle A and which is on the left side of the figure relative to the portion indicated in the broken-lined circle B, along the circumferential direction D2. In the portion indicated in the broken-lined circle D as such, it is ensured that the dimension L2 from a given end 241 to the other end 242 of the BM 24 along the circumferential direction D2 is smaller than the dimension L1 of the BM 24 within the broken-lined circle A, but is greater than the dimension L3 of the BM 24 within the broken-lined circle B.

Moreover, in the liquid crystal panel 1 of the panel module 100 according to the present embodiment, the portion indicated in the broken-lined circle B in FIG. 1 corresponds to the central portion along the circumferential direction D2. In the portion indicated in the broken-lined circle B as such, it is ensured that, along the circumferential direction D2, the dimension L3 of the BM 24 is smaller than the respective dimensions L1 and L2 of the BM 24 within the broken-lined circles A and D.

Thus, in order to cope with the pixel electrode region Z2 being misaligned to a greater extent as getting closer to the end of the liquid crystal panel 1 in the figure, that is, away from the center, the liquid crystal panel 1 according to the present embodiment is constructed so that, along the circumferential direction D2, the dimension of the BM 24 increases away from the center of the liquid crystal panel 1 (CF substrate 2).

Therefore, in the liquid crystal panel 1 of the panel module 100 according to the present embodiment, in both of the central portion C and the excess portion E, intermixing of colors is suppressed even if misalignments in the pixel electrode regions Z2 occur in the aforementioned manner. The specific action and effects have already been described in Embodiment 1, and any detailed description thereof is omitted here.

Moreover, because of having the aforementioned construction, the liquid crystal panel 1 of the panel module 100 according to the present embodiment is able to keep the proportion of the BM 24 in the entire CF substrate 2 as small as possible. Therefore, a decrease in the display luminance of the liquid crystal panel 1, as would be caused by an increased region being occupied by the BM 24 in the CF substrate 2, can be kept as small as possible.

Moreover, the liquid crystal panel 1 of the panel module 100 according to the present embodiment is not limited to the aforementioned construction. For example, along the circumferential direction D2, the width of the BM 24 may have a constant width, rather than changing away from the center of the liquid crystal panel 1 (CF substrate 2).

Figure 4A:
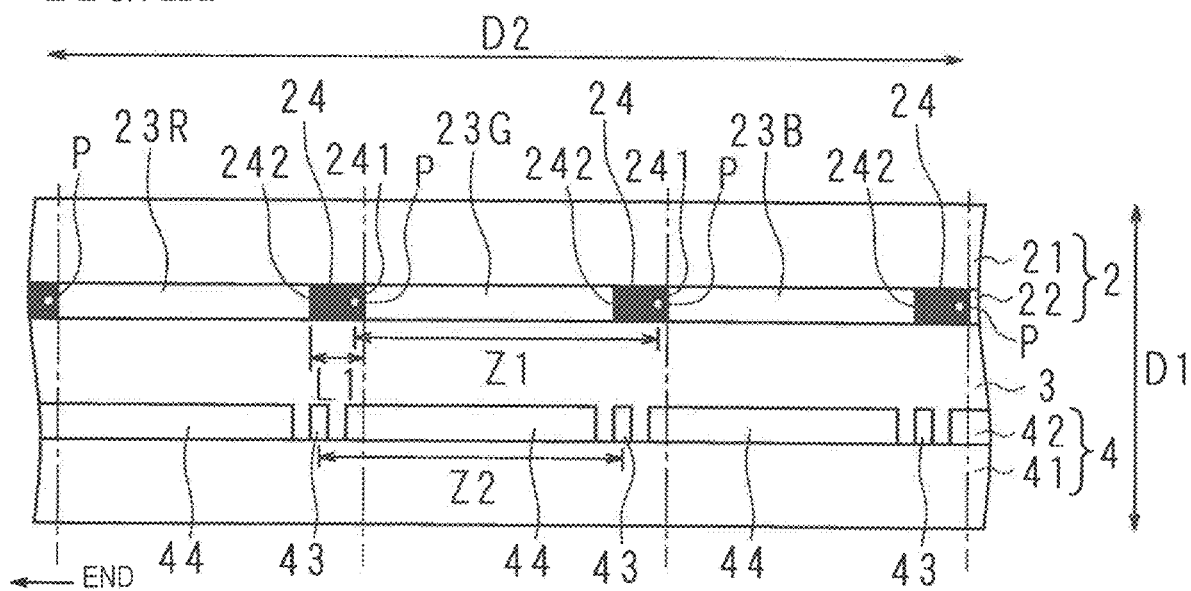
FIG. 4A is an enlarged view of a portion of the liquid crystal panel in FIG. 1 corresponding to a broken-lined circle A on the left side of the figure.
Figure 4B:
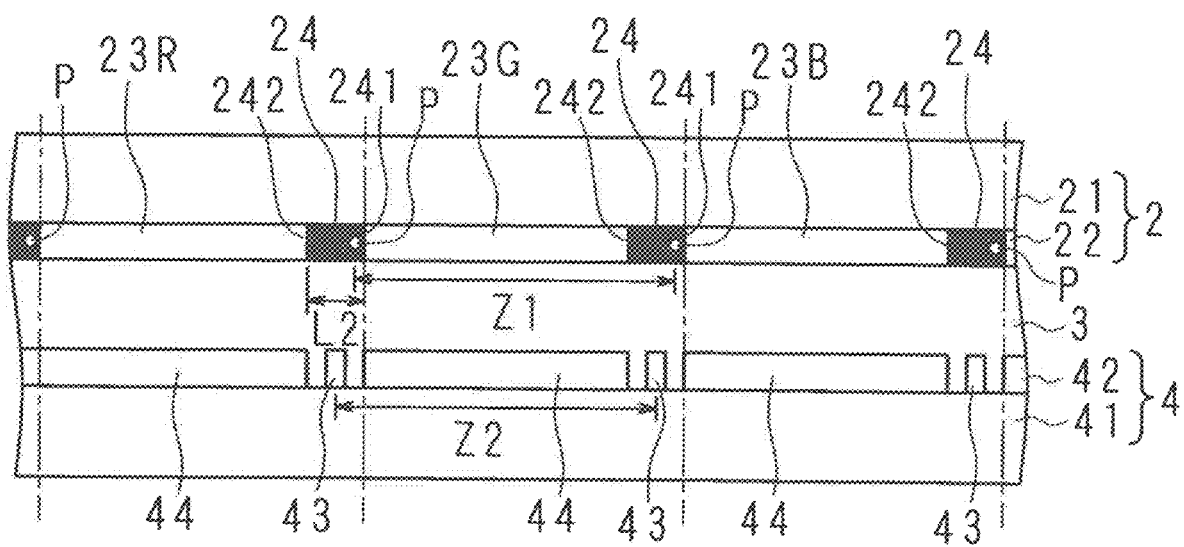
FIG. 4B is an enlarged view of a portion of the liquid crystal panel in FIG. 1 corresponding to a broken-lined circle D on the left side of the figure.
Figure 4C:
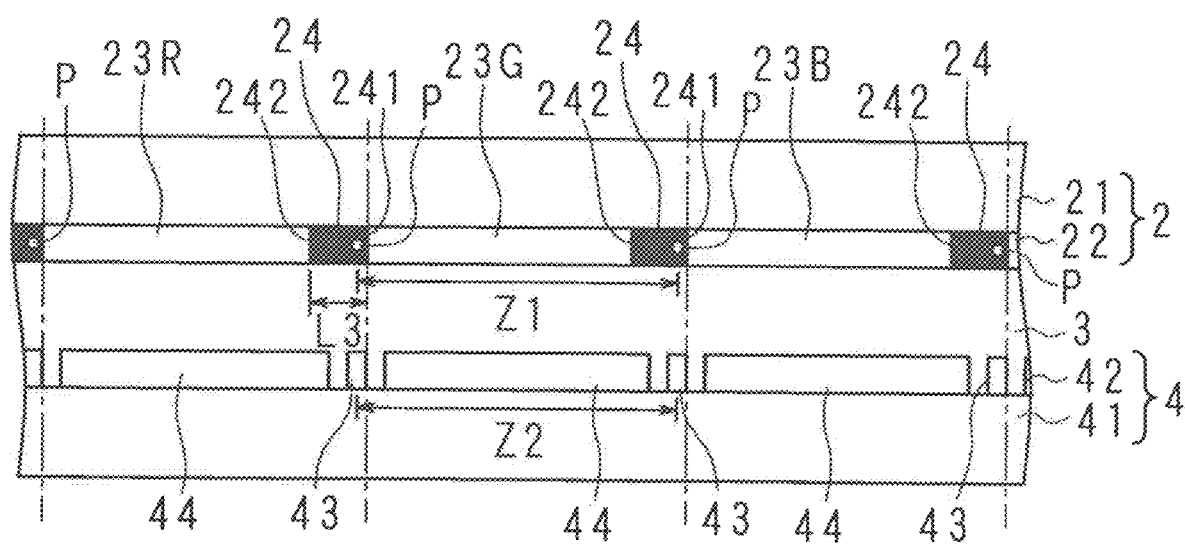
FIG. 4C is an enlarged view of a portion of the liquid crystal panel in FIG. 1 corresponding to a broken-lined circle B at the central portion of the figure.

FIG. 4A, FIG. 4B and FIG. 4C are explanatory diagrams for describing variants of the liquid crystal panel 1 of the panel module 100 according to Embodiment 2. FIG. 4A is an enlarged view of a portion of the liquid crystal panel 1 in FIG. 1 corresponding to a broken-lined circle A on the left side of the figure; FIG. 4B is an enlarged view of a portion of the liquid crystal panel 1 in FIG. 1 corresponding to a broken-lined circle D on the left side of the figure; and FIG. 4C is an enlarged view of a portion of the liquid crystal panel 1 in FIG. 1 corresponding to a broken-lined circle B at the central portion of the figure.

FIG. 4A, FIG. 4B, and FIG. 4C show, along the circumferential direction D2, portions from the center to the left in the figure of the liquid crystal panel 1. FIG. 4C shows a central portion of the liquid crystal panel 1 along the circumferential direction D2; FIG. 4A shows a left end portion in the figure of the liquid crystal panel 1 along the circumferential direction D2; and FIG. 4B shows a portion which is on the left side of the central portion in the figure of the liquid crystal panel 1 along the circumferential direction D2, but which is closer to the central portion than is the left end in the figure. Note that FIG. 4C shows, within the central portion of the liquid crystal panel 1, what lies slightly towards the left of the center along the circumferential direction D2.

In the variant of the liquid crystal panel 1 of the panel module 100, the dimension of the BM 24 along the circumferential direction D2 is constant wherever in the central portion C and the excess portion E of the liquid crystal panel 1 (CF substrate 2), along the circumferential direction D2.

In the liquid crystal panel 1 (see FIG. 1), the following are all equal: the dimension L1 of the BM 24 within the portion indicated in the broken-lined circle A, which corresponds to an end on the left side of the figure along the circumferential direction D2 relative to the portions indicated in the broken-lined circles D and B; the dimension L2 of the BM 24 within the portion indicated in the broken-lined circle D, which is closer to the central portion than is the portion indicated in the broken-lined circle A and which corresponds to the left side of the portion indicated in the broken-lined circle B in the figure; and the dimension L3 of the BM 24 within the portion indicated in the broken-lined circle B, which corresponds to the central portion.

In the variant of the liquid crystal panel 1 of the panel module 100, the dimensions L1, L2 and L3 of the BM 24 are equal to a dimension of the BM 24 that is needed in order to prevent intermixing of colors at the left end portion of the liquid crystal panel 1 along the circumferential direction D2 in the figure, for example.

It will be appreciated that, intermixing of colors due to misalignments in the pixel electrode regions Z2 can be suppressed also in the case where the liquid crystal panel 1 has such a construction.

Portions similar to those of Embodiment 1 are denoted by like numerals, with their detailed description omitted.

Embodiment 3

The above description has illustrated exemplary cases where the liquid crystal panel 1 and the light source 5 are curved so that, in the liquid crystal panel 1, the CF substrate 2 is on the outer side and the active matrix substrate 4 is on the inner side regarding the radial direction D1; however, the present invention is not limited thereto.

FIG. 5 is a diagram schematically showing a main configuration of a liquid crystal panel 1 of a panel module 100 according to Embodiment 3. In the liquid crystal panel 1 of the panel module 100 according to Embodiment 3, the CF substrate 2 and the active matrix substrate 4 are curved so as to be convex toward the active matrix substrate 4. In other words, in the panel module 100 according to the present embodiment, the liquid crystal panel 1 and the light source 5 are curved with a predetermined curvature, such that the light source 5 is on the outer side and the liquid crystal panel 1 is on the inner side regarding the radial direction D1. Moreover, in the liquid crystal panel 1, the CF substrate 2 is on the inner side and the active matrix substrate 4 is on the outer side regarding the radial direction D1. The present invention is also applicable to such a case.

In the liquid crystal panel 1 of the panel module 100 according to the present embodiment may be susceptible to a problem in that the CF substrate 2 may be misaligned. In other words, a problem may occur in that the pixel electrode region Z2 may have a relative misalignment.

Specifically, since the CF substrate 2 and the active matrix substrate 4 are curved and opposed to each other so as to be convex toward the active matrix substrate 4, a varying radius of curvature will exist because of the thickness of the substrates and the interspace into which liquid crystal is to be injected (i.e., thickness of the liquid crystal layer 3). The varying radius of curvature induces a problem in that the positions of the color filter regions Z1 and the pixel electrode regions Z2 as viewed along the opposing direction may not match but be misaligned near both ends of the liquid crystal panel 1, while they may match in a central portion of the liquid crystal panel 1 along the circumferential direction D2, for example.

Figure 6A:
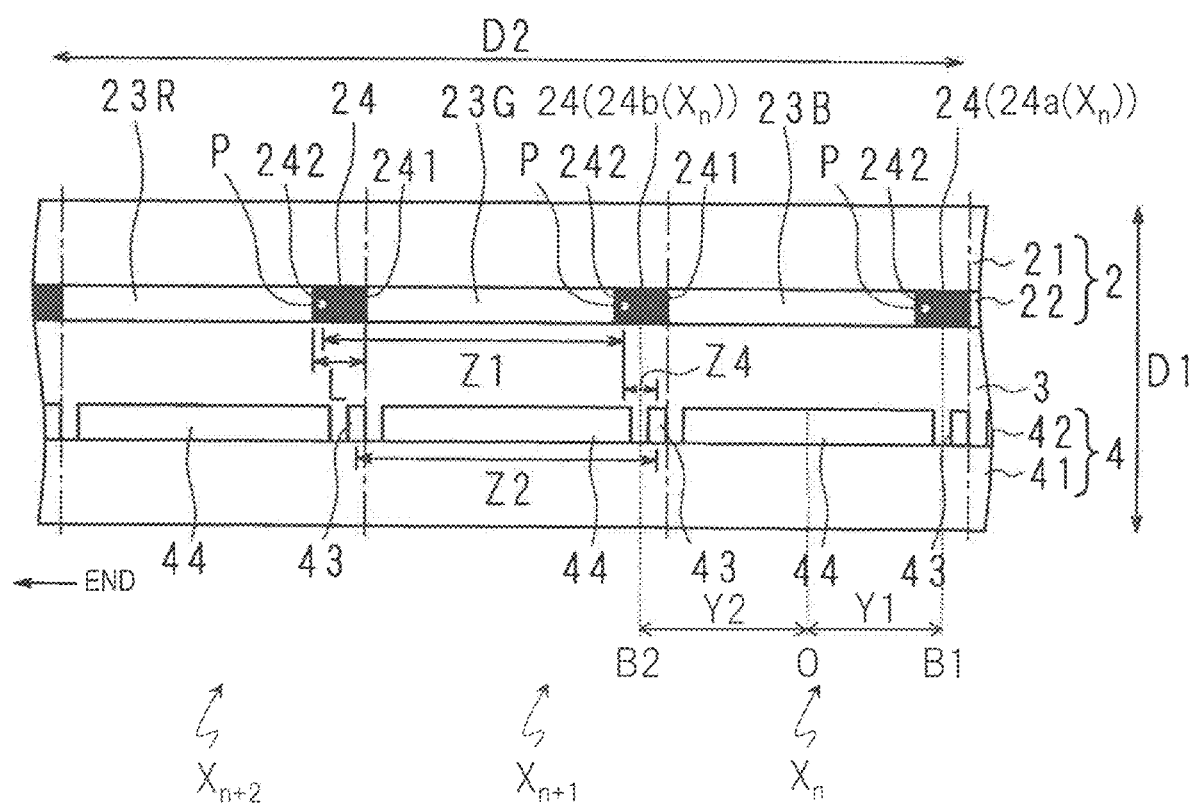
FIG. 6A is an enlarged view in which the left end in FIG. 5 is shown enlarged.
Figure 6C:
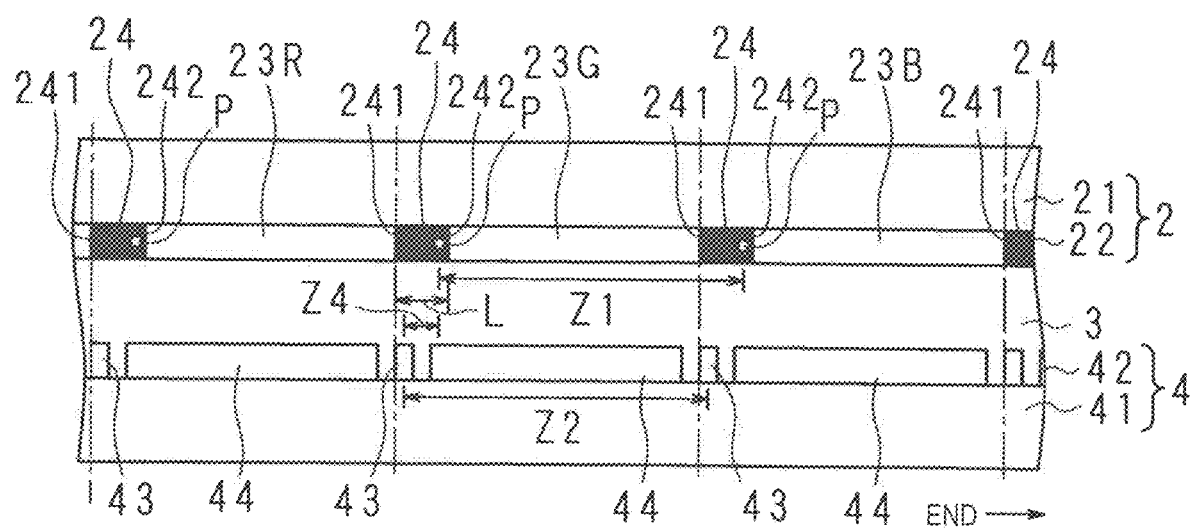
FIG. 6C is an enlarged view in which the right end in FIG. 5 is shown enlarged.

FIG. 6A, FIG. 6B, and FIG. 6C are enlarged views of the liquid crystal panel 1 of the panel module 100 according to Embodiment 3, in which the three places in FIG. 5 are shown enlarged. FIG. 6A is an enlarged view in which the left end in FIG. 5 is shown enlarged; FIG. 6B is an enlarged view in which the central portion C along the circumferential direction D2 in FIG. 5 is shown enlarged; and FIG. 6C is an enlarged view in which the right end in FIG. 5 is shown enlarged.

In the central portion C of the CF substrate 2, the color filter regions Z1 and the pixel electrode regions Z2 are orthogonally opposed, such that, regarding the radial direction D1, the BM 24 and the wiring lines 43 match in position.

In the excess portion E, however, a color filter region Z1 and a pixel electrode region Z2 are not orthogonally opposed, such that the color filter region Z1 and the pixel electrode region Z2 are not matched regarding the radial direction D1. In the liquid crystal panel 1, at the portion E1 which is on the left side of the figure with respect to the central portion C, the color filter regions Z1 of the CF substrate 2 are misaligned toward the left end along the circumferential direction D2. Moreover, in the liquid crystal panel 1, at the portion E2 which is on the right side of the figure with respect to the central portion C, the color filter regions Z1 of the CF substrate 2 are misaligned toward the right end along the circumferential direction D2.

In other words, the color filter region Z1 that needs to be opposed to one pixel electrode region Z2 is suffering a misalignment, such that a portion of the pixel electrode region Z2 is opposed to another color filter region Z1 that is adjacent to the one color filter region Z1, along the radial direction D1. In the following, such a portion of the pixel electrode region Z2 will be referred to as a deviation.

On the other hand, in the liquid crystal panel 1 of Embodiments 1 and 2, the pixel electrode region Z2 of the active matrix substrate 4 is misaligned toward the left end along the circumferential direction D2 (see FIG. 2A) in the portion E1 on the left side of the figure with respect to the central portion C, and is misaligned toward the right end along the circumferential direction D2 (see FIG. 2C) in the portion E2 on the right side of the figure with respect to the central portion C. In this aspect, the liquid crystal panel 1 of the panel module 100 according to the present embodiment differs from Embodiments 1 and 2.

In the panel module 100 according to the present embodiment, too, intermixing of colors may occur in the excess portion E due to occurrence of misalignments in the color filter regions Z1. Intermixing of colors associated with misalignments has already been described, and detailed description thereof is omitted here. However, the panel module 100 according to the present embodiment is constructed so that such a problem of intermixing of colors can be suppressed. Hereinafter, this will be described in detail.

In the panel module 100 according to the present embodiment, in the central portion C and the excess portion E of the CF substrate 2, the dimension of the BM 24 in the excess portion E of the CF substrate 2 is greater than the dimension of the BM 24 in the central portion C.

The BM 24 is such that the interspace between a given end 241 that is closer to the central portion and the other opposite end 242 (i.e., the width of each light shielding portion along the first direction) is not constant along the circumferential direction D2. Moreover, the BM 24 is constructed so that the dimension L from each given end 241 to the other end 242 along the circumferential direction D2 is greater in the excess portion E of the CF substrate 2 than at the central portion C of the CF substrate 2.

For example, in the excess portion E (the portion E1 in FIG. 5) shown in FIG. 6A, each given end 241 of the BM 24 is on the right side of the figure, whereas the other end 242 is on the left side of the figure. In the excess portion E (the portion E2 in FIG. 5) shown in FIG. 6C, each given end 241 of the BM 24 is on the left side of the figure, whereas the other end 242 is on the right side of the figure. Moreover, in both of FIG. 6A and FIG. 6C, the given ends 241 are indicated with dot-dash lines. Furthermore, in the BM 24, the dimension L from each given end 241 to the other end 242 along the circumferential direction D2 is greater in the excess portion E of the CF substrate 2 (FIG. 6A and FIG. 6C) than at the central portion C of the CF substrate 2 (FIG. 6B).

With such construction, in the panel module 100 according to the present embodiment, intermixing of colors is suppressed in the excess portion E even if misalignments in the color filter regions Z1 occur in the aforementioned manner. Hereinafter, this will be described in detail with reference to FIG. 6A (the portion E1 in the excess portion E).

The color filter region Z1 of a color filter 23G that needs to be orthogonally opposed to the pixel electrode region Z2 may suffer a misalignment toward the left side of the figure regarding the radial direction D1, whereby a portion of the pixel electrode region Z2 that needs to be opposed to the color filter region Z1 of the color filter 23G may become opposed also to a portion of the color filter region Z1 of a color filter 23B. In this state, light that substantially perpendicularly enters the active matrix substrate 4 will pass through the pixel electrode region Z2 and the liquid crystal layer 3, and enter the CF substrate 2. However, since the color filter region Z1 is misaligned, such light will enter astride the color filter regions Z1 of the color filter 23G and the color filter 23B.

However, in the panel module 100 according to the present embodiment, the dimension L of the BM 24 along the circumferential direction D2 is greater in the excess portion E than at the central portion C of the CF substrate 2. Therefore, a deviation Z4 of the pixel electrode region Z2 on the right side of the figure will substantially match the position of a portion including the other end 242 (the portion beginning from a given end 241 of the BM 24 that is closer to the central portion and extending to the other opposite end 242, i.e., a light shielding portion) regarding the circumferential direction D2, and become opposed to the portion including the other end 242 regarding the radial direction D1. As a result, even if light enters astride the color filter regions Z1 of the color filter 23G and the color filter 23B, the light that has entered the color filter region Z1 of the color filter 23B will be blocked by the portion of the BM 24 including the other end 242. That is, light which has been transmitted through the color filter 23B will not be included in the displaying by a G pixel having the color filter 23G, and thus intermixing of colors will not occur.

The portion E2 in the excess portion E will be described in detail with reference to FIG. 6C.

The color filter region Z1 of a color filter 23G that needs to be orthogonally opposed to the pixel electrode region Z2 may suffer a misalignment toward the right side of the figure regarding the radial direction D1, whereby a portion of the pixel electrode region Z2 that needs to be opposed to the color filter region Z1 of the color filter 23G may become opposed also to a portion of the color filter region Z1 of a color filter 23R. In this state, light will enter astride the color filter regions Z1 of the color filter 23G and the color filter 23R.

However, in the panel module 100 according to the present embodiment, the dimension L of the BM 24 along the circumferential direction D2 is greater in the excess portion E than at the central portion C of the CF substrate 2. Therefore, a deviation Z4 of the pixel electrode region Z2 on the left side of the figure will substantially match the position of a portion including the other end 242 (the portion beginning from a given end 241 of the BM 24 that is closer to the central portion and extending to the other opposite end 242, i.e., a light shielding portion) regarding the circumferential direction D2, and become opposed to the portion including the other end 242 regarding the radial direction D1. As a result, even if light enters astride the color filter regions Z1 of the color filter 23G and the color filter 23R, the light that has entered the color filter region Z1 of the color filter 23R will be blocked by the portion of the BM 24 including the other end 242. That is, light which has been transmitted through the color filter 23R will not be included in the displaying by a G pixel having the color filter 23G, and thus intermixing of colors will not occur.

On the other hand, as shown in FIG. 6B, the aforementioned misalignments in the color filter regions Z1 do not occur at the central portion C, and thus no deviation exists; although the dimension L of the BM 24 along the circumferential direction D2 is smaller than in the excess portion E of the CF substrate 2, no problem of intermixing of colors will occur.

As shown in FIG. 6A, the first end portion E1 includes a plurality of end pixels. The end pixels shown in FIG. 6A will be denoted as end pixels $X_n$, $X_{n+1}$ and $X_{n+2}$, these being closer to the central portion C in this order. Regarding the end pixel $X_n$, the center B1 of a first light shielding portion 24a ($X_n$) that is disposed closer to the central portion C along the first direction, the center B2 of a second light shielding portions 24b ($X_n$) that is disposed opposite from the central portion C along the first direction, and the center O of the end pixel X along the first direction are located so that the distance Y1 between the center O and the center B1 along the first direction is smaller than the distance Y2 between the center O and the center B2 along the first direction (Y1<Y2). Moreover, although illustration and description thereof will be omitted, the aforementioned relationship (Y1<Y2) holds true also in the second end portion E2 shown in FIG. 6C.

Moreover, the present invention is not limited by the above description. As in Embodiment 2, it may be ensured that the dimension L of the BM 24 along the circumferential direction D2 differs depending on the position on the liquid crystal panel 1 (CF substrate 2) along the circumferential direction D2.

Figure 7A:
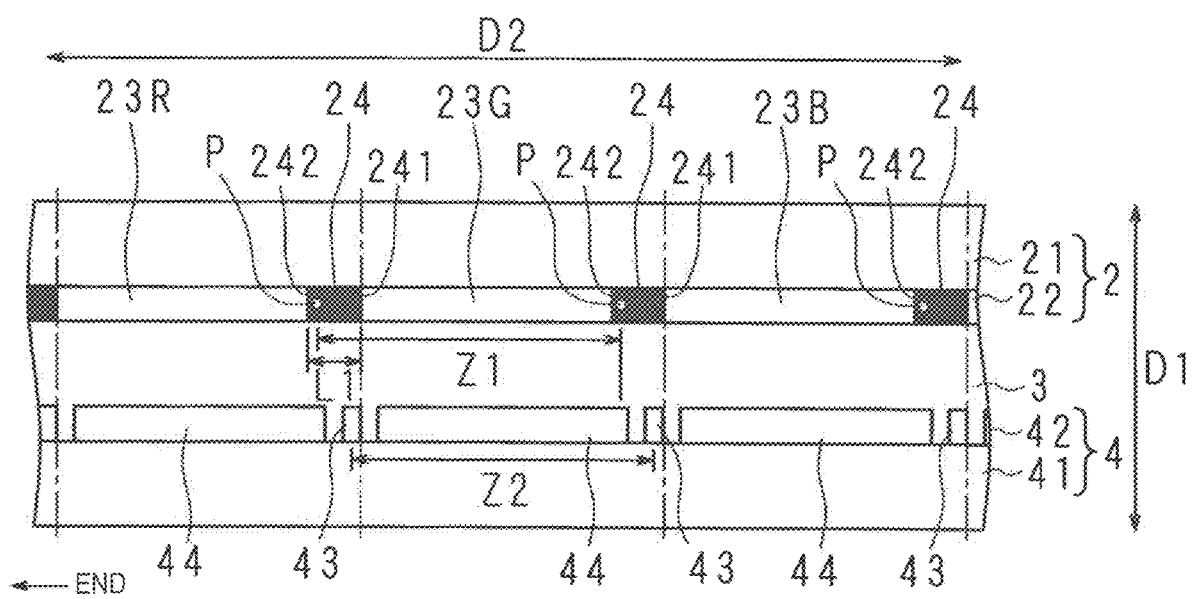
FIG. 7A is an enlarged view in which the left end in FIG. 5 is shown enlarged.
Figure 7B:
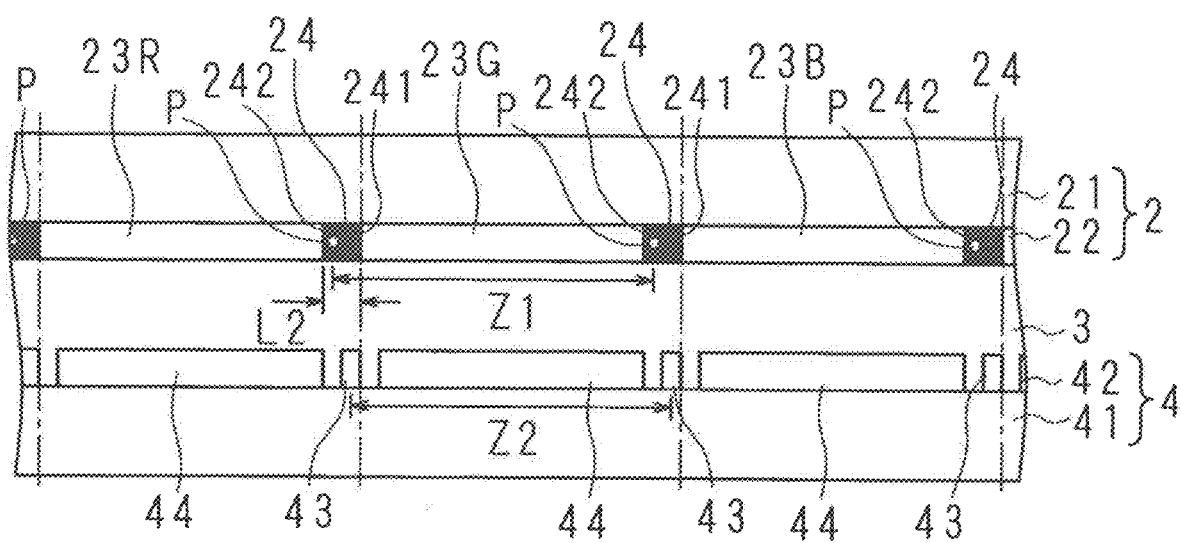
FIG. 7B is an enlarged view in which an intermediate portion between the left end and the center along the circumferential direction in FIG. 5 is shown enlarged.
Figure 7C:
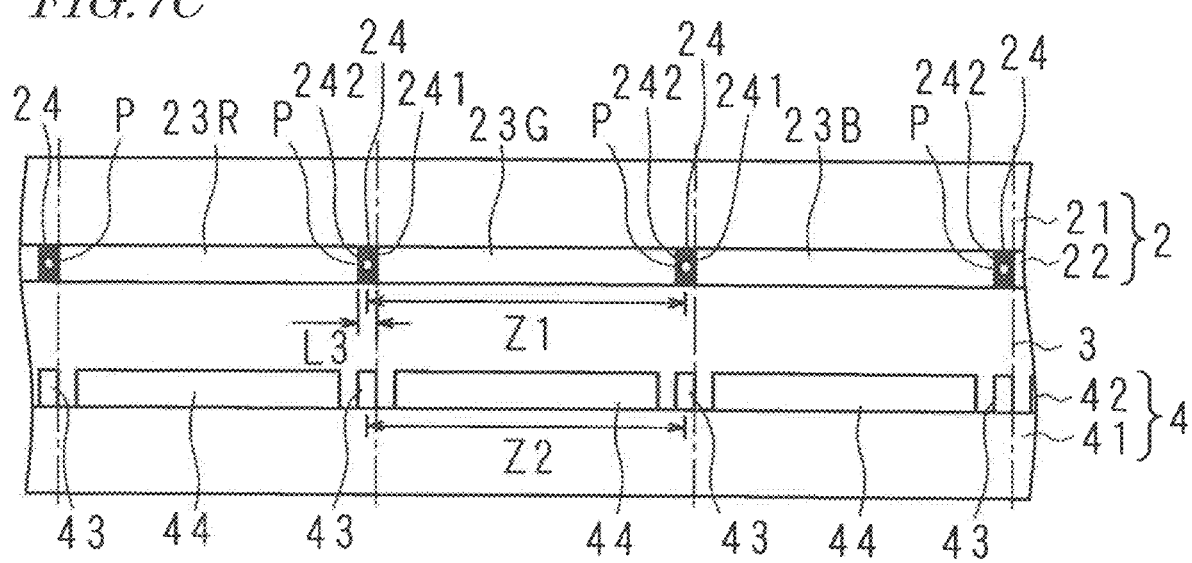
FIG. 7C is an enlarged view in which a central portion along the circumferential direction in FIG. 5 is shown enlarged.

FIG. 7A, FIG. 7B, and FIG. 7C are enlarged views of a variant of the liquid crystal panel 1 of the panel module 100 according to Embodiment 3, in which the three places in FIG. 5 are shown enlarged. FIG. 7A is an enlarged view in which the left end in FIG. 5 is shown enlarged; FIG. 7B is an enlarged view in which an intermediate portion between the left end and the center along the circumferential direction D2 in FIG. 5 is shown enlarged; and FIG. 7C is an enlarged view in which the central portion C along the circumferential direction D2 in FIG. 5 is shown enlarged.

In FIG. 7A and FIG. 7B, a color filter region Z1 is misaligned toward the left end in the figure of the liquid crystal panel 1 along the circumferential direction D2. Also, it can be seen that, along the circumferential direction D2, the color filter region Z1 is misaligned to a greater extent as getting closer to the left end in the figure of the liquid crystal panel 1, that is, away from the center.

Accordingly, the liquid crystal panel 1 of the panel module 100 according to this variant is constructed so that in the central portion C and the excess portion E of the CF substrate 2, the dimension from a given end 241 to the other end 242 of the BM 24 along the circumferential direction D2 increases away from the center of the liquid crystal panel 1 (CF substrate 2) along the circumferential direction D2.

In other words, in the liquid crystal panel 1, the portion shown in FIG. 7A, the portion shown in FIG. 7B, and the portion shown in FIG. 7C are farther away from the center in this order, along the circumferential direction D2. Moreover, the dimension L1 of the BM 24 as per FIG. 7A, the dimension L2 of the BM 24 as per FIG. 7B, and the dimension L3 of the BM 24 as per FIG. 7C are of the relationship L1>L2>L3.

Therefore, in the liquid crystal panel 1 of the panel module 100 according to this variant, in both of the central portion C and the excess portion E, intermixing of colors is suppressed even if misalignments in the color filter regions Z1 occur in the aforementioned manner. The specific action and effects have already been described in Embodiment 1, and any detailed description thereof is omitted here.

Moreover, the present invention is not limited by the above description. In an alternative construction, it may only be within the bounds of the excess portion E of the liquid crystal panel 1 (CF substrate 2) that the dimension from each given end 241 to the other end 242 of the BM 24 increases away from the center of the liquid crystal panel 1 (CF substrate 2) along the circumferential direction D2.

Portions similar to those of Embodiment 1 are denoted by like numerals, with their detailed description omitted.

Embodiment 4

In a liquid crystal panel 1 of a panel module 100 according to Embodiment 4, a light source 5 is constructed so as to emit light of higher luminance toward the excess portion E than toward the central portion C of the liquid crystal panel 1 (CF substrate 2). In other words, the panel module 100 includes the liquid crystal panel 1 and the backlight device 5 having a plurality of light sources to emit light toward the liquid crystal panel 1, where the plurality of light sources are adapted so that the luminance of light which is emitted toward the plurality of end pixels can be made higher than the luminance of light which is emitted toward the plurality of central pixels. Hereinafter, this will be described in detail.

With the construction described in any of Embodiments 1 to 3, the panel module 100 suppresses intermixing of colors even if misalignments in the pixel electrode regions Z2 may occur as aforementioned.

However, in the case where the panel module 100 as described in any of Embodiments 1 to 3 is constructed so that the dimension L of the BM 24 along the circumferential direction D2 is greater in the excess portion E of the CF substrate 2 than at the central portion C of the CF substrate 2, the luminance of light which passes through the color filters 23 in the excess portion E of the CF substrate 2 may possibly be relatively lower than the luminance light which passes through the color filters 23 in the central portion C. The liquid crystal panel 1 of the panel module 100 according to Embodiment 4 is constructed so as to address this problem.

Note that, the problem of intermixing of colors is likely to occur in the case where light enters substantially perpendicularly to a pixel region that is associated with a pixel electrode. When light obliquely enters a pixel region that is associated with a pixel electrode, for example, when the substrate that is associated with the pixel region is curved but the light source to emit light toward such a substrate has a flattened plate shape, the problem is less likely to occur.

Figure 8:
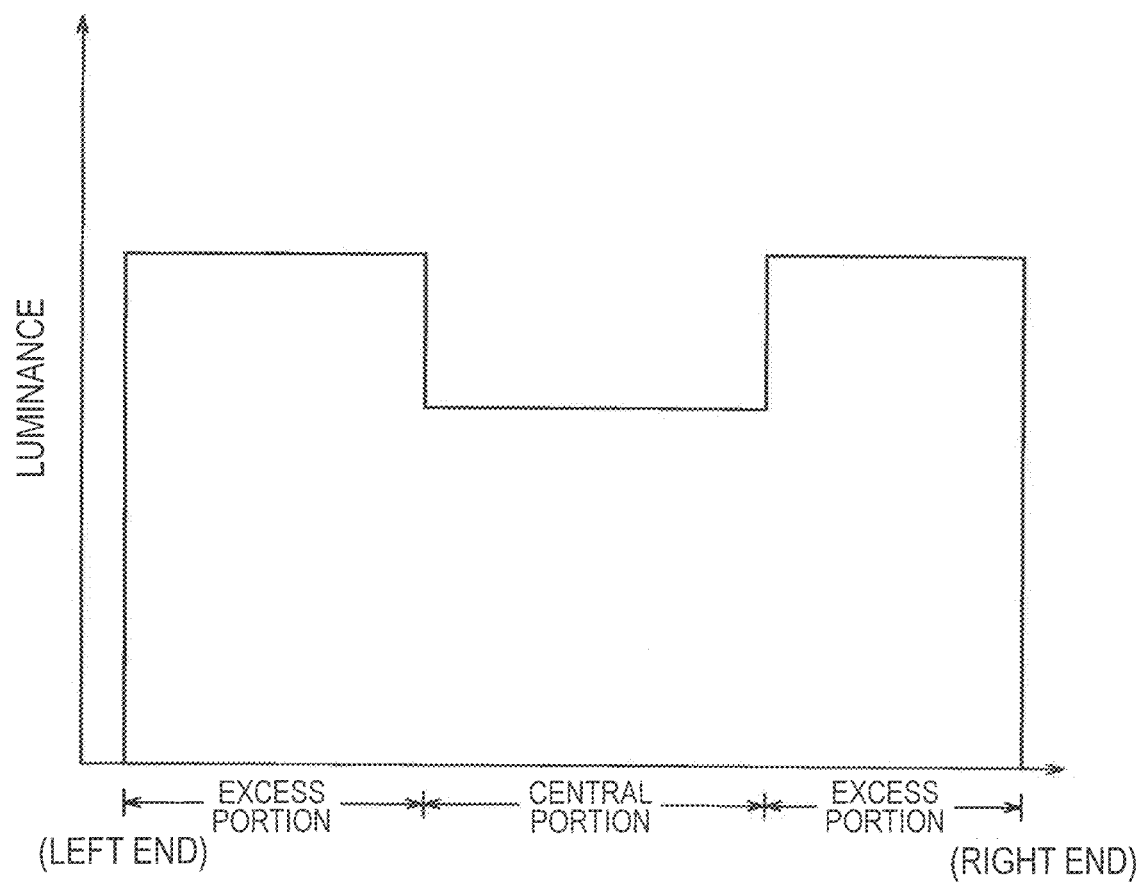
FIG. 8 is a diagram showing luminance of light which is emitted from a light source of a liquid crystal panel of a panel module according to Embodiment 4.

FIG. 8 is a diagram showing luminance of light which is emitted from the light source 5 of the liquid crystal panel 1 of the panel module 100 according to Embodiment 4. As shown in FIG. 8, the light source 5 emits light of higher luminance toward the excess portion E of the liquid crystal panel 1 (CF substrate 2) than toward the central portion C.

In order to obtain luminance as shown in FIG. 8, for example, more LEDs 51 may be used in the portion of the light source 5 which radiates light to the excess portion E of the liquid crystal panel 1 than in the portion which radiates light to the central portion C, or, LEDs 51 of higher luminance may be employed in the portion which radiates light to the excess portion E of the liquid crystal panel 1 than in the portion which radiates light to the central portion C.

In the liquid crystal panel 1 according to the present embodiment, the light source 5 has a light source distribution as shown in FIG. 8, so that light of higher luminance than that of light passing through the color filters 23 in the central portion C will pass through the color filters 23 in the excess portion E of the CF substrate 2. This compensates for a decrease in luminance that is associated with the dimension L of the BM 24 along the circumferential direction D2 being greater in the excess portion E of the CF substrate 2 than at the central portion C of the CF substrate 2, whereby an image with a uniform luminance distribution is displayed across the entire liquid crystal panel 1.

Embodiment 5

In a liquid crystal panel 1 of a panel module 100 according to Embodiment 5, a light source 5 is constructed so as to emit light of higher luminance toward the excess portion E than toward the central portion C of the liquid crystal panel 1 (CF substrate 2), and to emit light of consecutively higher luminance closer to the end of the liquid crystal panel 1 (CF substrate 2). In other words, the first end portions E1 includes a first region disposed closer to the central portion and a second region disposed on an opposite side from the central portion; the second end portion E2 includes a third region disposed closer to the central portion and a fourth region disposed on an opposite side from the central portion; the plurality of light sources being adapted so that the luminance of light to be emitted toward the pixels contained in the second region can be made higher than the luminance of light to be emitted toward the pixels contained in the first region; and that the luminance of light to be emitted toward the pixels contained in the fourth region can be made higher than the luminance of light to be emitted toward of the pixels contained in the third region. Hereinafter, this will be described in detail.

With the construction described in any of Embodiments 1 to 3, the panel module 100 suppresses intermixing of colors even if misalignments in the pixel electrode regions Z2 may occur as aforementioned.

However, when the dimension L of the BM 24 along the circumferential direction D2 is adapted so as to increase away from the center of the liquid crystal panel 1 (CF substrate 2) along the circumferential direction D2, the luminance of light passing through the color filters 23 of the CF substrate 2 may possibly become lower away from the center of the liquid crystal panel 1 (CF substrate 2). The liquid crystal panel 1 of the panel module 100 according to Embodiment 5 is constructed so as to address this problem.

Figure 9:
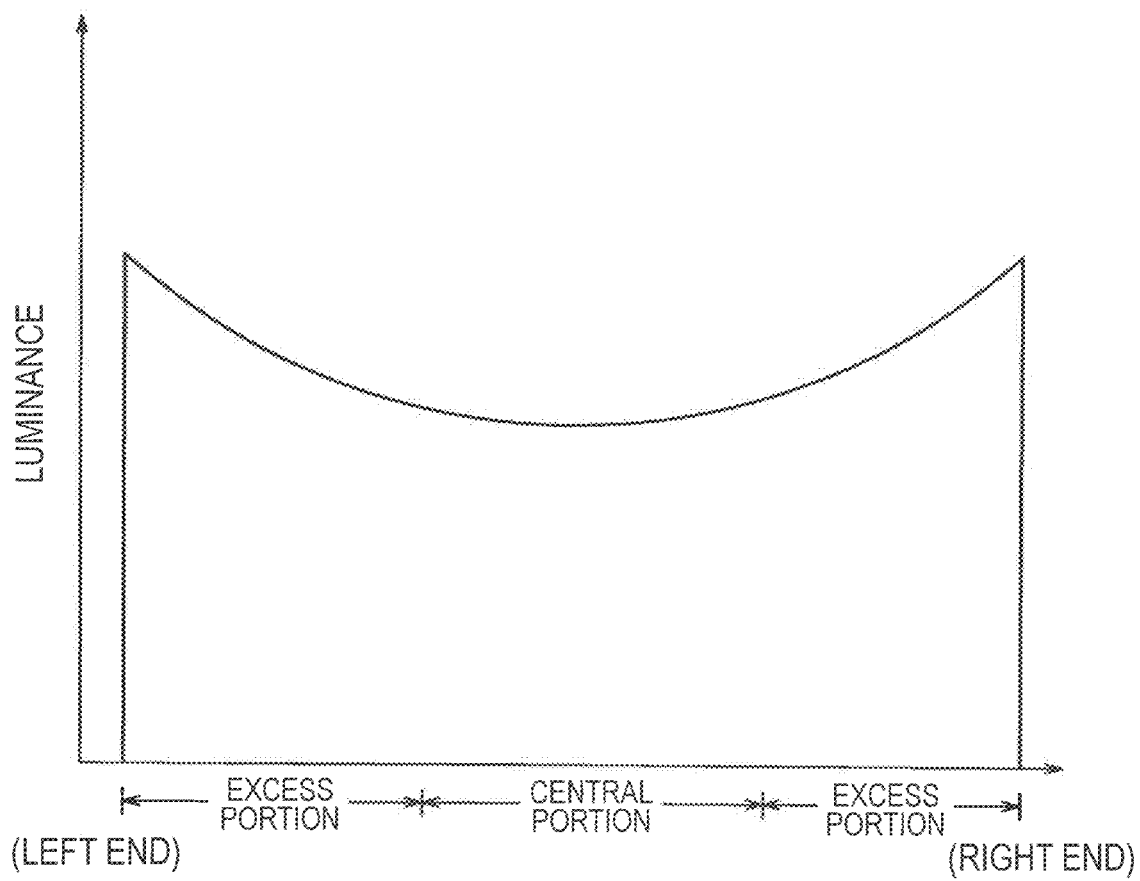
FIG. 9 is a diagram showing luminance of light which is emitted from a light source of a liquid crystal panel of a panel module according to Embodiment 5.

FIG. 9 is a diagram showing the luminance of light which is emitted from the light source 5 of the liquid crystal panel 1 of the panel module 100 according to Embodiment 5. As shown in FIG. 9, away from the center of the liquid crystal panel 1, i.e., as getting closer to both ends of the liquid crystal panel 1, the light source 5 emits light of consecutively higher luminance to the liquid crystal panel 1 (CF substrate 2).

In the liquid crystal panel 1 of the panel module 100 according to the present embodiment, since the light source 5 has a light source distribution as shown in FIG. 9, light of consecutively higher luminance will pass through the color filters 23 of the CF substrate 2, away from the center of the liquid crystal panel 1. This compensates for a decrease in luminance that is associated with the dimension L of the BM 24 along the circumferential direction D2 becoming greater away from the center of the liquid crystal panel 1 (CF substrate 2) along the circumferential direction D2, whereby an image with a uniform luminance distribution is displayed across the entire liquid crystal panel 1.

The liquid crystal panel 1 of the panel module 100 according to the present embodiment is not limited to the above description. For example, in the case of a liquid crystal panel 1 of a construction such that the dimension L of the BM 24 along the circumferential direction D2 is greater in the excess portion E of the CF substrate 2 than at the central portion C of the CF substrate 2, it may be within the bounds of the excess portion E that the light source 5 emits light of consecutively higher luminance away from the center of the liquid crystal panel 1.

The present application is based on Japanese Patent Application No. 2018-146955, filed on Aug. 3, 2018, the entire disclosure of which is incorporated herein by reference.

What is claimed is:

1. A display panel having a display region including a plurality of pixels arrayed along a first direction and along a second direction which is different from the first direction, the display panel comprising a first substrate and a second substrate opposing each other, the first substrate and the second substrate being curved along the first direction, wherein:
the first substrate has a color filter layer that includes: a plurality of color filters provided respectively corresponding to the plurality of pixels; and a black matrix having a plurality of light shielding portions disposed between adjacent color filters adjoining along the first direction;
the second substrate includes a plurality of pixel electrodes respectively included in the plurality of pixels;
the display region includes a central portion including a center of the display region along the first direction and, on both sides of the central portion along the first direction, a first end portion and a second end portion that are located adjacent to the central portion;
the plurality of pixels include a plurality of central pixels contained in the central portion and a plurality of end pixels contained in the first end portion or the second end portion;
the plurality of light shielding portions include a plurality of central light shielding portions contained in the central portion and a plurality of end light shielding portions contained in the first end portion or the second end portion;
a first width of the plurality of end light shielding portions along the first direction is greater than a second width of the plurality of central light shielding portions along the first direction;
each of the plurality of end light shielding portions and each of the plurality of central light shielding portions are disposed between two adjacent color filters of different colors adjoining along the first direction.

2. The display panel of claim 1, wherein:
the first end portion includes a first region disposed closer to the central portion and a second region disposed on an opposite side from the central portion;
the second end portion includes a third region disposed closer to the central portion and a fourth region disposed on an opposite side from the central portion;
the plurality of end light shielding portions include a plurality of first end light shielding portions contained in the first region, a plurality of second end light shielding portions contained in the second region, a plurality of third end light shielding portions contained in the third region, and a plurality of fourth end light shielding portions contained in the fourth region; and
a width of the plurality of second end light shielding portions along the first direction is greater than a width of the plurality of first end light shielding portions along the first direction, and a width of the plurality of fourth end light shielding portions along the first direction is greater than a width of the plurality of third end light shielding portions along the first direction.

3. A display panel apparatus comprising: the display panel of claim 2; and a backlight device include a plurality of light sources which emit light toward the display panel, wherein:
luminance of light emitted from the plurality of light sources toward the plurality of end pixels is higher than luminance of light emitted from the plurality of light sources toward the plurality of central pixels; and luminance of light emitted from the plurality of light sources toward pixels contained in the second region is higher than luminance of light emitted from the plurality of light sources toward pixels contained in the first region, and luminance of light emitted from the plurality of light sources toward pixels contained in the fourth region is higher than luminance of light emitted from the plurality of light sources toward pixels contained in the third region.

4. The display panel of claim 1, wherein:
the first substrate and the second substrate are curved so as to be convex toward the first substrate; and
regarding a certain end pixel among the plurality of end pixels, a center B1 along the first direction of a first light shielding portion disposed closer to the central portion, a center B2 along the first direction of a second light shielding portion disposed on an opposite side from the central portion, and a center O along the first direction of the certain end pixel are located so that a distance between the center O and the center B1 along the first direction is greater than a distance between the center O and the center B2 along the first direction.

5. The display panel of claim 1, wherein:
the first substrate and the second substrate are curved so as to be convex toward the second substrate; and
regarding a certain end pixel among the plurality of end pixels, a center B1 along the first direction of a first light shielding portion disposed closer to the central portion, a center B2 along the first direction of a second light shielding portion disposed on an opposite side from the central portion, and a center O along the first direction of the certain end pixel are located so that a distance between the center O and the center B1 along the first direction is smaller than a distance between the center O and the center B2 along the first direction.

6. A display panel apparatus comprising: the display panel of claim 1; and a backlight device include a plurality of light sources which emit light toward the display panel, wherein luminance of light emitted from the plurality of light sources toward the plurality of end pixels is higher than luminance of light emitted from the plurality of light sources toward the plurality of central pixels.

7. The display panel apparatus of claim 6, wherein:
the backlight device further includes a housing having an opening and a bottom surface opposed to the opening;
the plurality of light sources are provided on the bottom surface;
the plurality of light sources emit light toward the display panel via the opening;
the plurality of light sources include a plurality of central light sources emitting light toward the central portion and a plurality of end light sources emitting light toward the first end portion or the second end portion; and
a number of the plurality of end light sources is more than a number of the plurality of central light sources and/or luminance of light emitted from the plurality of end light sources is higher than luminance of light emitted from the plurality of central light sources such that luminance of light emitted from the plurality of light sources toward the plurality of end pixels is higher than luminance of light emitted from the plurality of light sources toward the plurality of central pixels.

8. The display panel of claim 1, wherein each of the plurality of end light shielding portions and each of the plurality of central light shielding portions are opposed to a wiring line disposed between two adjacent pixel electrodes adjoining along the first direction among the plurality of pixel electrodes.

9. The display panel of claim 8, wherein:
- each of the plurality of end light shielding portions includes
- a first portion disposed closer to the central portion and beginning from a given end of the end light shielding portion that is closer to the central portion and extending along the first direction to a position, a width of the first portion along the first direction being equal to the second width, and
- a second portion disposed on an opposite side from the central portion and beginning from another opposite end of the end light shielding portion that is farther from the central portion and extending along the first direction to the position; and
- the second portion of each of the plurality of end light shielding portions is opposed to the wiring line.

\* \* \* \* \*